(12) United States Patent
Nowak

(10) Patent No.: US 12,352,431 B2
(45) Date of Patent: *Jul. 8, 2025

(54) CHEMICAL DISPENSING SYSTEM FOR TREATING FLUID IN BOILER/COOLING SYSTEMS

(71) Applicant: Condor Technologies, Inc., Camden, DE (US)

(72) Inventor: Andy Nowak, Camden, DE (US)

(73) Assignee: Condor Technologies, Inc., Camden, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/244,723

(22) Filed: Sep. 11, 2023

(65) Prior Publication Data

US 2023/0417408 A1    Dec. 28, 2023

Related U.S. Application Data

(63) Continuation of application No. 17/160,228, filed on Jan. 27, 2021, now Pat. No. 11,761,624, which is a
(Continued)

(51) Int. Cl.
*F22B 37/48* (2006.01)
*C02F 1/68* (2023.01)
(Continued)

(52) U.S. Cl.
CPC ............ *F22B 37/486* (2013.01); *C02F 1/686* (2013.01); *F22D 11/06* (2013.01);
(Continued)

(58) Field of Classification Search
CPC .. F22B 37/486; C02F 1/686; C02F 2103/023; C02F 2201/005; C02F 2303/08;
(Continued)

(56) References Cited

U.S. PATENT DOCUMENTS

| | | |
|---|---|---|
| 2,591,427 A | 4/1952 | Harkey |
| 3,276,994 A | 10/1966 | Andrews |

(Continued)

FOREIGN PATENT DOCUMENTS

| | | | |
|---|---|---|---|
| CN | 203310527 U | | 11/2013 |
| CN | 105686946 A | * | 6/2016 |

(Continued)

*Primary Examiner* — Bob Zadeh
(74) *Attorney, Agent, or Firm* — Weber Rosselli & Cannon LLP

(57) ABSTRACT

Powered and non-powered kits for the treatment of fluid in boiler and cooling systems, both open and closed recirculating are disclosed. The kits generally include a fluid container, a fluid connector configured to engage the fluid container, a hose configured for fluid communication with the fluid connector, a port, a fluid container suspension means, and a hose end support member. The fluid container is configured to enclose chemical agents and/or solutions. The port may be formed along the fluid container and be configured to receive the fluid connector. The hose end support member may support at least one portion of the hose at a desired height above the standing fluid to be treated. In embodiments, a metering pump is included with the kits, the metering pump configured to cause a predetermined amount of the chemical agents or solutions to be dispersed from the fluid container.

16 Claims, 16 Drawing Sheets

Related U.S. Application Data continuation of application No. 16/058,691, filed on Aug. 8, 2018, now Pat. No. 10,920,978.

(51) Int. Cl.
  *F22D 11/06* (2006.01)
  *C02F 103/02* (2006.01)

(52) U.S. Cl.
  CPC .. *C02F 2103/023* (2013.01); *C02F 2201/005* (2013.01); *C02F 2303/08* (2013.01); *C02F 2303/22* (2013.01)

(58) Field of Classification Search
  CPC .... C02F 2303/22; C02F 1/50; C02F 2303/20; F22D 11/06
  See application file for complete search history.

(56) References Cited

U.S. PATENT DOCUMENTS

| | | | |
|---|---|---|---|
| 3,291,308 A | 12/1966 | Headrick et al. | |
| 3,477,581 A | 11/1969 | Stearns | |
| 3,562,137 A | 2/1971 | Gehring | |
| 3,650,950 A | 3/1972 | White | |
| 3,920,547 A | 11/1975 | Garrison et al. | |
| 4,204,955 A | 5/1980 | Armstrong | |
| 4,306,967 A | 12/1981 | Trautwein | |
| 4,341,641 A | 7/1982 | Novak | |
| 4,764,283 A | 8/1988 | Ashbrook et al. | |
| 4,874,509 A | 10/1989 | Bullock | |
| 4,938,758 A * | 7/1990 | Al-Sioufi | A61M 1/0209 604/416 |
| 5,145,585 A | 9/1992 | Coke | |
| 5,167,806 A | 12/1992 | Wang et al. | |
| 5,180,499 A | 1/1993 | Hinson et al. | |
| 5,273,664 A | 12/1993 | Schulz | |
| 5,275,732 A | 1/1994 | Wang et al. | |
| 5,316,246 A | 5/1994 | Scott et al. | |
| 5,362,395 A | 11/1994 | Dorau et al. | |
| 5,453,207 A | 9/1995 | Simpson et al. | |
| 5,582,718 A * | 12/1996 | Sobczak | C02F 1/50 222/630 |
| 5,785,864 A | 7/1998 | Teran et al. | |
| 6,096,219 A | 8/2000 | Green et al. | |
| 6,106,711 A | 8/2000 | Morse et al. | |
| 6,183,646 B1 | 2/2001 | Williams et al. | |
| 6,773,603 B2 | 8/2004 | Moorehead et al. | |
| 6,818,179 B1 | 11/2004 | Edgson et al. | |
| 7,832,714 B2 | 11/2010 | Duesel, Jr. et al. | |
| 8,211,296 B2 | 7/2012 | Angelilli et al. | |
| 8,753,520 B1 | 6/2014 | Fischmann | |
| 8,790,518 B2 | 7/2014 | Torres | |
| 9,771,710 B2 | 9/2017 | Hawks | |
| 10,920,978 B2 * | 2/2021 | Nowak | C02F 1/686 |
| 11,761,624 B2 * | 9/2023 | Nowak | C02F 1/686 122/401 |
| 2003/0173276 A1 | 9/2003 | Arnaud | |
| 2003/0173288 A1 | 9/2003 | Arnaud | |
| 2004/0097801 A1 | 5/2004 | Mesallum | |
| 2004/0260232 A1 * | 12/2004 | Cimino | A61M 3/022 604/151 |
| 2005/0145548 A1 | 7/2005 | Rhoades | |
| 2005/0205257 A1 | 9/2005 | Sloan | |
| 2005/0274657 A1 * | 12/2005 | McKinney | C02F 1/008 210/151 |
| 2007/0093775 A1 * | 4/2007 | Daly | A61J 1/1418 604/414 |
| 2007/0173980 A1 * | 7/2007 | Lovett | G05D 11/133 700/265 |
| 2007/0215346 A1 | 9/2007 | Sloan et al. | |
| 2008/0108942 A1 | 5/2008 | Brister et al. | |
| 2010/0032030 A1 | 2/2010 | Peterson | |
| 2011/0144613 A1 | 6/2011 | Pepper et al. | |
| 2013/0264261 A1 | 10/2013 | Fischmann | |
| 2014/0234166 A1 | 8/2014 | Erickson | |
| 2015/0166383 A1 * | 6/2015 | Visnja | B01D 21/00 204/229.4 |
| 2016/0200607 A1 * | 7/2016 | Gilron | C02F 3/1273 210/151 |
| 2018/0186656 A1 * | 7/2018 | Drewniak | C02F 5/125 |
| 2020/0049342 A1 | 2/2020 | Nowak | |
| 2023/0417408 A1 * | 12/2023 | Nowak | F22D 11/06 |

FOREIGN PATENT DOCUMENTS

| | | | |
|---|---|---|---|
| DE | 2931495 A1 | | 2/1981 |
| FR | 2499869 A1 | * | 8/1982 |
| JP | 2002115293 A | | 4/2002 |

\* cited by examiner

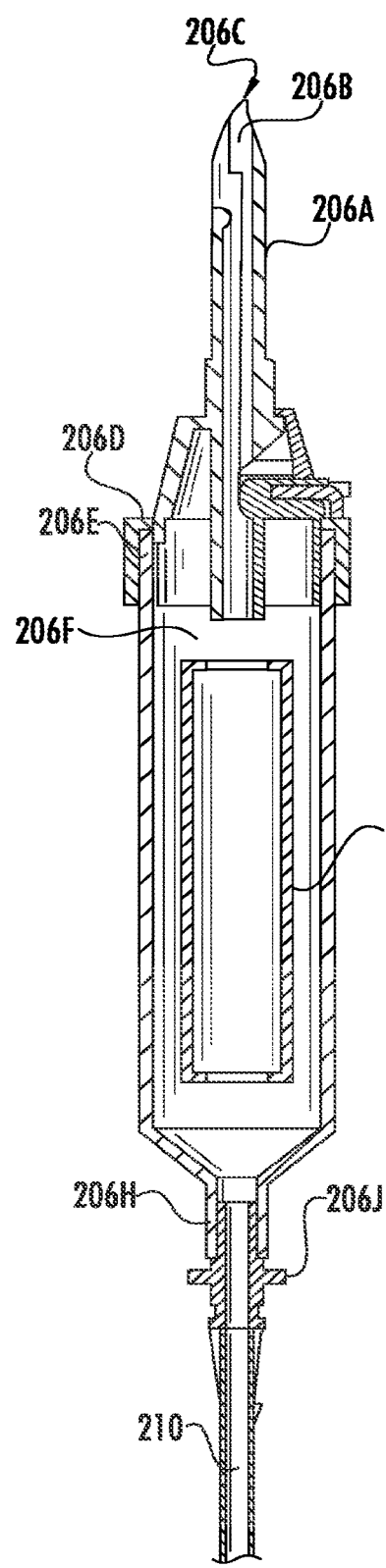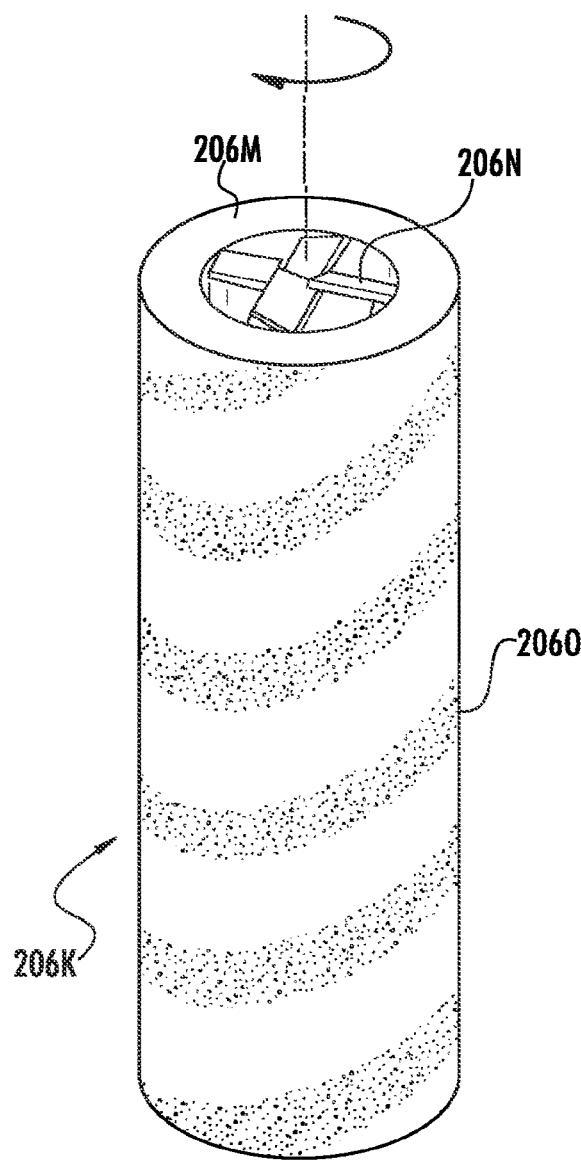
206
FIG. 4
FIG. 5

1400

CHEMICAL DISPENSING SYSTEM FOR TREATING FLUID IN BOILER/COOLING SYSTEMS

BACKGROUND

Technical Field

The present disclosure relates to systems and methods of treating standing fluids and recirculating fluid systems, and more particularly to systems and methods of treating fluid susceptible to issues and concerns associated with scaling, fouling, deposition, and microbiological activity. More particularly, the present disclosure relates to systems for treating standing and recirculated fluids in cooling systems, air handling systems, boilers, feed water tanks, and other open or closed loop fluid systems susceptible to scaling, fouling, deposition, and the growth of bacterial and/or viral contaminants.

Background of the Related Art

In commercial structures (e.g., office buildings, power plants, food packaging and processing facilities, etc.), air handling, treatment, and conditioning systems (commonly referred to as "cooling systems"), often rely on cooling towers or evaporative condensers for transferring energy to reduce the ambient temperature in portions of such commercial structures. Additionally, these cooling systems may be tailored to the specific needs of one or more processes being performed (e.g., to maintain the temperature of sensitive articles such as meats, dairy products, and the like). These cooling towers rely on evaporation, and the circulation of non-evaporated fluid, to transfer heat energy away from the structures they are associated with. Depending on the cooling system design, the fluids used may be re-circulated to increase the overall efficiency of a cooling system, for purposes such as, without limitation, fluid conservation. Over time, during the operation of such cooling systems, bacterial and viral contaminants may interact with fluids associated with the cooling systems, as well as the cooling system generally, and lead to introduction of contaminants. Additionally, the cooling systems may be subject to scaling or buildup of materials (e.g., mineral deposits), as well as corrosion of components in contact with fluids or vapors within the cooling systems.

Commercial structures may also include ducting coupled to condensers which operate separately from, or in conjunction with, cooling towers. Depending on the quality of the air fed into the ducting (e.g., the moisture content of the air (humidity) and the particulates or materials suspended in the air), fluids and mineral deposits may aggregate in or around the condenser over time. These built up or standing fluids can be similarly contaminated with bacterial or viral contaminants, and subsequently lead to the transfer of the contaminants into the environment of the structure. Similar to the cooling systems, the ducts of the air handling systems may be subject to scaling, mineral buildup, and corrosion. While bacterial and viral buildup may be hazardous in all settings, the risks may increase when handling air in environments associated with food production, livestock cultivation, and agriculture generally.

There are variety of heating systems including steam and hot water systems that require feed water to make up for steam and water that is lost at various points in the system. These points may include around valve packing, as part of steam seals on turbines and other equipment, leaks, periodic blow downs, etc. As a result these systems typically include a feed tank where water can be added to the heating system. Again, these feed tanks may suffer from issues with corrosion, deposition, fouling, or carryover/priming. While not posing a true problem for the boiler or its operation, these operational issues still represent a danger for those working on or near the feed tanks.

Accordingly, the disclosure of systems and methods of providing minimally invasive systems to treat circulated or standing fluids is desirable.

SUMMARY

In accordance with aspects of the present disclosure, a kit for treating standing or recirculating fluid is provided. The kit includes a fluid container including a first region and a second region, the fluid container configured to enclose one or more chemical agents for treatment of standing fluids. The kit further includes a fluid connector configured for engagement with the fluid container, a hose configured for fluid communication with the fluid container, a port formed on the second region of the fluid container configured for receipt of the fluid connector, a fluid container suspension means far suspending the fluid container at a desired height, and a hose support member configured to support at least one portion of the hose at a desired height above fluid to be treated.

In aspects, the hose support member is configured to be engaged with a fastener to affix the hose support member to a metal surface. The kit may further include an intermediate hose support configured to be in fixable communication with the hose and a metal surface. The intermediate hose support may include a magnetic portion configured to be attached to a metal surface.

In aspects, the fluid container may be prefilled with at least a cleaning fluid from the group including a chemical cleaning agent/solution/chemical, a biocide (oxidizing and/or non-oxidizing), biodetergent, a biostatic, an acidic or alkaline solution, a neutral solution, a solvent, and solutions and mixtures thereof.

According to aspects, the fluid container includes at least two compartments divided by at least one membrane. The two compartments may be pierced to permit fluid communication of the liquid stored in the at least two compartments. The two compartments may contain different treatment solutions/chemical/fluids which mix upon piercing of the at least one membrane. The fluid container, the fluid container suspension means, and the hose may be preassembled.

In aspects, the hose support member includes at least one leg and a hose receiver configured to be in fixable communication with the hose.

BRIEF DESCRIPTION OF THE DRAWINGS

FIG. 4 is a diagram illustrating a flow indicating chamber containing a flow indicator;

FIG. 5 is an illustration of the flow indicator of FIG. 5;

DETAILED DESCRIPTION

Figure 1A:
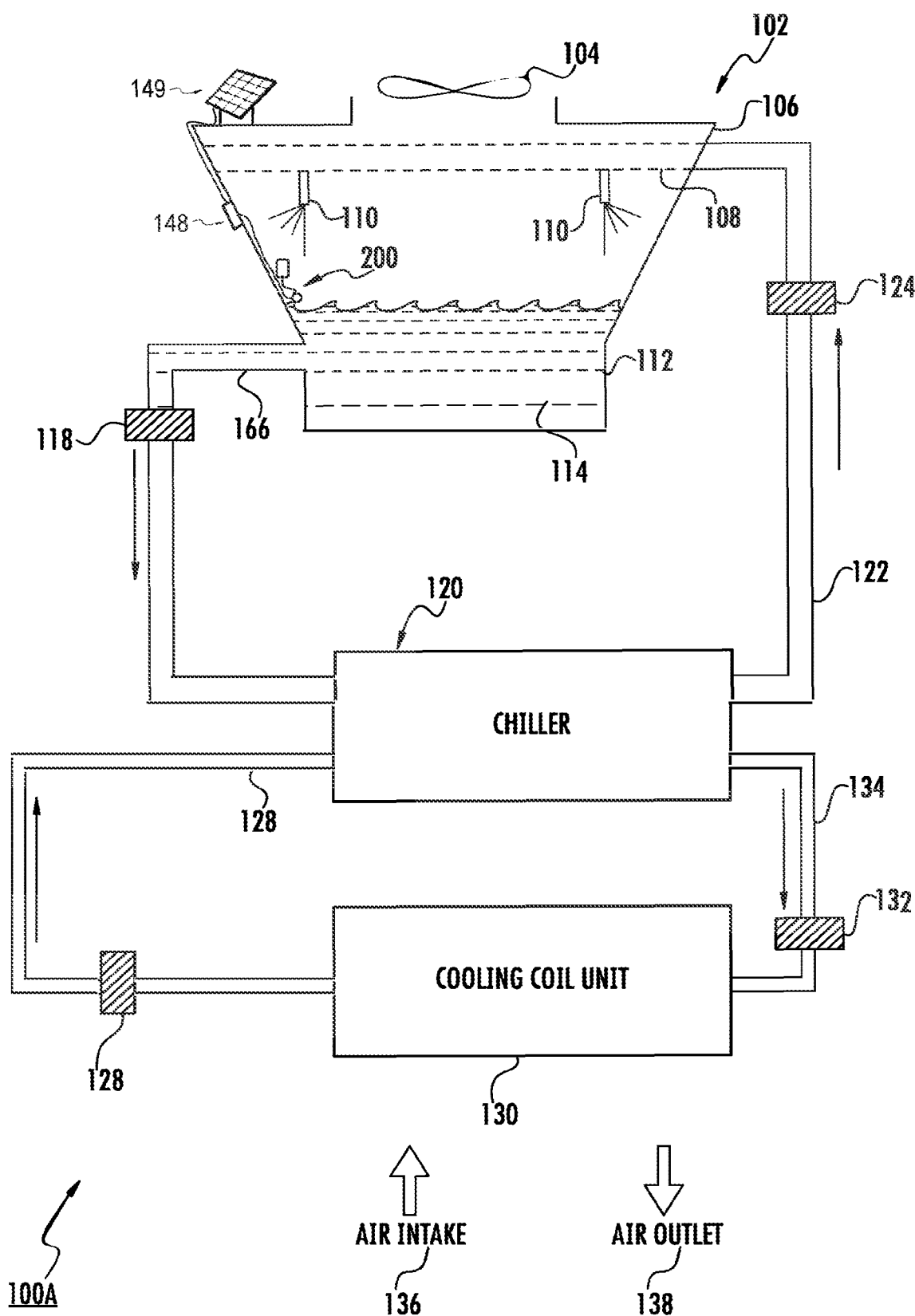
FIG. 1A is a diagram illustrating a fluid treatment system installed in a cooling tower or water cooled condenser of an air handling system, in accordance with embodiments of the present disclosure.

The present disclosure is directed to treatment systems for integration in heating/cooling and air handling systems where fluids circulate, collect, or otherwise stand during operation. Specifically, embodiments of the present disclosure include inhibitors and passive biocide systems configured for installation in cooling towers, boilers, and/or air handling compartments of heating, ventilation, and air conditioning (HVAC) systems. Described in detail herein, inhibitors and biocide systems (interchangeably referred to as "dosing systems") may be installed to treat circulating or standing fluid in HVAC systems as well as other forms of air handling systems which, due to their design, engage in passive or active thermal transfer during the cooling and air handling process. As used herein, the term "chemical agent" refers to chemicals or compounds which are disbursable as liquids or dissolvable solids. Examples of chemical agents include, without limitation, sodium hypochlorite, chlorine dioxide, or other similar chemical compositions or compounds which adversely affect living organisms when present in sufficient quantities and concentrations. Additional examples of chemical agents include, without limitation, corrosion and scale inhibition chemicals configured to combat corrosion as well as the deposit of minerals (e.g., quad polymers, azoles, alkylphosphonate salts, carboxylic acids, benzotriazole, zinc phosphate, tannic acid, zinc salts, benzalkonium chloride, etc.). In embodiments, chemical agents such as inhibitors (e.g., polymers, dispersants, tracing agents, etc.) may be included with or substituted for the chemical agents. It will be understood that these example agents are provided for illustrative purposes and, as such, are not intended to limit the present disclosure.

As used herein, the term "dose" refers to the dispersal of one or more chemical agents or other fluids from a system, the dispersal directing the chemical agent or agents toward standing or recirculating fluid in an HVAC system, a boiler, condenser, or other similar system where standing or circulated fluids (e.g., water) are present. While the disclosed embodiments are directed to the installation of a biocide system in cooling towers, air handling systems, and boilers these principles may also be applied to other locations prone to collect standing or recirculating fluids such as, without limitation, sumps, drains, and fluid retention areas and/or circulation systems. In embodiments, the systems and methods described herein may be employed to maintain heating systems such as steam boilers and/or hot water boilers.

One example, introduced for illustrative purposes only, and not intended to be limiting, includes the installation of treatment systems in cooling towers to disperse or dose chemical agents to tower sumps. The treatment dosing systems may be suspended above a cooling tower's internal or external sump to provide or dose the chemical agents at varying rates and in varying quantities to the retained fluids, the dosing occurring via a gravity feed. Depending on the evaporation and replacement of the fluid in the cooling tower, the dosing of the fluid may be varied or adjusted to maintain predetermined quantities of the chemical agents in the fluid.

Another example includes the installation of a treatment and dosing system in air handling compartments which include condensate basins or other similar areas capable of collecting fluid. As thermal variation between air and air handling compartment surfaces increases, water vapor may condense and form along the air handling compartment surfaces. The condensed water vapor may subsequently come into direct contact with air which is later introduction into an environment. Over time, this condensed vapor may harbor pathogens such as those noted above, and enable their later introduction into the building they are disposed near or on.

To prevent bacterial or viral growth in the air handling compartment, particularly in any built-up of fluid (e.g., the condensed water vapor) in or around a housing of the air handling compartment, dispersal or dosing of chemical agents may be performed by one or more biocide systems located in or near the air handling compartment. The chemical agents, once introduced to the standing fluid, reduce or prevent the growth of bacterial or viral contaminants and by extension their potential for introduction into adjoining spaces and environments. Dosing may be performed in compliance with regulatory or manufacturer dosing requirements associated with the chemical agents.

Referring now to FIG. 1A, illustrated is an embodiment of the present disclosure including a dosing or fluid treatment system 200 (FIG. 2) installed in a cooling tower/condenser 102 of a refrigeration system 100A. The cooling tower 102 includes a fan 146 that directs airflow into or out of the interior of the cooling tower 102. A cooling tower intake pipe or cooling tower intake 108 carries cooling fluid 114, such as water, into the cooling tower 102. The cooling fluid 114 is then dispersed along the cooling tower surfaces 106 via atomizers/spray nozzles 110 in fluid connection with the cooling tower intake 108. As the nozzles 110 disperse cooling fluid 114 along the cooling tower surfaces 106, portions of the cooling fluid 114 evaporate, causing the cooling tower surfaces 106 to dissipate heat and reduce in temperature. The remaining portions of the cooling fluid 114 that do not evaporate fall to a basin or tower sump 112 of the cooling tower 102.

Additional fluid is introduced into the cooling system 100A via a fluid intake (not shown) to maintain a predetermined volume of cooling fluid 114 in the cooling system 100A. As additional fluid is introduced to the cooling system 100A the existing cooling fluid 114 is diluted, including any chemical agents dissolved or suspended in the cooling fluid 114.

As the cooling tower 102 is exposed to air to allow for evaporation, bacterial and viral contaminants thereinafter "contaminants") in the air enter and may contact the cooling fluid 114 in the cooling tower 102. Contaminants may include, without limitation, bacterial and viral pathogens (e.g., Legionella), slime, algae, fungi, microorganisms, and other organisms which may cause harm to the health of an individual. The contaminants may, if untreated, continue to grow or accumulate, thereby contaminating the cooling tower 102 and, more specifically, the cooling fluid 114. The potentially contaminated cooling fluid 114 may subsequently contaminate components of the cooling system 100A and, by extension, air handled by the cooling system 100A. In addition to contaminants being microbiologically related, there are similar concerns with deposition, fouling and corrosion from the concentration of the water, specifically their subsequent contact with treated air and/or any of the various components of the air handling system 100A.

The fluid treatment system 200 disperses chemical agents into the tower sump 112, thereby dosing the cooling fluid 114. In response, the cooling fluid 114 comprises the non-evaporated fluid dispersed along the cooling tower surfaces 106, fluid added to the cooling system to maintain the overall volume of fluid in the cooling system, and chemical agents added by the fluid treatment system 200. A more detailed description of the fluid treatment system 200 will be discussed in detail with regard to FIG. 2.

The cooling fluid 114 (e.g., water, or other known coolants) passes from the tower sump 112 through a cooling tower outlet pipe or cooling tower outlet 116 when an outlet pump 118 is engaged. The cooling fluid 114 is subsequently directed into a chiller 120 which facilitates the transfer of thermal energy from chiller components (not shown) to the cooling fluid 114. As a result, the cooling fluid 114 becomes warmer, having accepted thermal energy from the chiller 120, and flows through a chiller outlet pipe 122. The chiller outlet pipe 122 is coupled to, and in fluid communication with, an outlet pump 124 and the cooling tower intake 108 which receives the cooling fluid 114. The transfer of cooling fluid from the cooling tower 102 to the chiller 120, and back, is referred to herein as a first cooling fluid loop.

The chiller 120 is in fluid connection with, and receives fluid from, a chiller intake pipe or chiller intake 126, the fluid forced into the chiller 120 via a chiller intake pump 128. The chiller 120 is additionally in fluid connection with, and transfers fluid into, a chiller outlet pipe or chiller outlet 134. The chiller outlet 134 has a chiller outlet pump 132 located thereon which forces fluid located in the chiller outlet 134 into the cooling coil unit 130. The fluid in the cooling coil unit 130 passes through coils (not shown) which receive air from an air intake 136 and transmits air via an air outlet 138 there over. As the air is passed through the cooling coil unit 130, thermal energy is transferred, and the air is cooled while the fluid in the coils is heated. The fluid exits the coils and flows into the chiller intake 126. The flow of fluid from the chiller 120 to the cooling coil unit 130 is referred to as a second fluid loop. Though described here in terms of chilling air, a very similar system is employed in many types of refrigeration systems including ammonia refrigeration systems where the chiller 120 acts as a condenser converting the vaporized ammonia back to a liquid, and absorbs all the heat of the ammonia vapor, to be released to the environment by the cooling tower 102. Other refrigeration systems can also benefit from the present disclosure, including other gas refrigeration systems.

In one embodiment of the present disclosure, the fluid treatment system 200 helps prevent systematic contamination upon the occurrence of deposition, corrosion, and ultimately, catastrophic failure of the chiller 120. Upon such a failure, fluid from the first cooling loop and the second cooling loop may interact in the chiller 120 due to inadequate maintenance or even natural wear and tear which affect the internal components (not shown) of the chiller 120. Once the fluid in the second loop is contaminated in the chiller 120, the contaminated fluid flows into the cooling coil unit 130. Where leaks are present in the cooling coil unit 130, or any portion of the chiller intake 126 or chiller outlet 134 enclosed in the building structure the spread of the contaminants continues. These contaminants may interact with air outlet 138 and provide a risk to personnel and livestock. Installation of a fluid treatment system 200 doses the cooling fluid 114 of the first cooling loop with chemical agents to both reduce or eliminate the result of such a failure, and minimize the risk of personnel performing the follow-up maintenance and repair to place the system back into normal operation.

While the fluid treatment system 200 is shown installed in the interior of the cooling tower 102, in embodiments, the fluid treatment system may be disposed along exterior surfaces of the cooling tower 102 and configured to dose the cooling fluid 114 therefrom. More particularly, the fluid treatment system 200 may be disposed within a housing (not shown) coupled to an exterior surface of the cooling tower 102. The hose 210 of the fluid treatment system 200 may be passed through an opening extending through the wall of the cooling tower 102 such that gravity-fed operation of the fluid treatment system 200 may be maintained similar to when the fluid treatment system 200 is completely disposed within the cooling tower 102. In embodiments, the hose 210 may couple to a pump or metering pump 148 powered either by an external power source (not shown) or a solar power system 149 including a solar panel and battery. The pump 148 may be any suitable pump for long-term delivery of chemical agents such as, without limitation, a peristaltic pump, a rotary lobe pump, a progressive cavity pump, and the like.

In a further aspect of the present disclosure, the metering pump 148 may in-fact be an aerosolizing pump that causes the chemical agent to become aerosolized. This aerosolized chemical agent may promote dispersion and treatment of the fluid. Such a system may be more closely associated with a deodorizing aerosolizes as is common in public restrooms and may include a controller as described herein below to properly dose the fluid.

Referring to FIG. 1B, a fluid treatment system 200 (FIG. 2) is installed in an air handling compartment 100B. The air handling compartment 100B may be part of a larger air handling system (not shown) which circulates air within an environment 150 of a building or structure (not shown). The air handling system includes an air handling compartment 100B which may be partially located in a building or structure. The air handling compartment 100B includes ducting or compartment surface 140 and in this example a compartment basin 142 defined by a portion of the compartment surface 140 for collection of condensate and the like. The air handling compartment 100B may additionally include a fan 146 which directs air through the air handling compartment 100B. The compartment basin 142, which may be nothing more than the bottom of the compartment surface 140, is typically formed of a metal such as galvanized or stainless steel at a location where standing fluid 144 tends to form in the air handling system.

Alternatively, instead of having a separate air handling compartment 100B forming a basin 142, the fan 146 and other air handling components (not shown) may be integrated into the air handling system compartment surface 140. As a result, the compartment basin 142 and compartment surface or compartment surface 140 may form portions of a continuous compartment surface system (not shown) which extends throughout the building or structure.

As the fan 146 forces air through the air handling compartment 100B low pressure areas form along the air handling compartment 100B and, as a result, condensation may form in the air handling compartment 100B. The condensation may form along the compartment surface 140 of the air handling compartment 100B, and due to gravity may fall to the compartment basin 142 where, as an aggregate, the condensation forms standing fluid 144. Since the air forced through the air handling compartment 100B may include trace amounts of the contaminants, the presence of condensate, and produce an environment where these contaminants can multiple to a point where they can produce a risk to workers as well as personnel and livestock within which the air handling compartment 100B is located. Again in accordance with the present disclosure, a fluid treatment system may be locally deployed to provide adequate treatment to the compartment basin 142 and eliminate the threat posed by the combination of pathogenic contaminants and water.

Figure 1B:
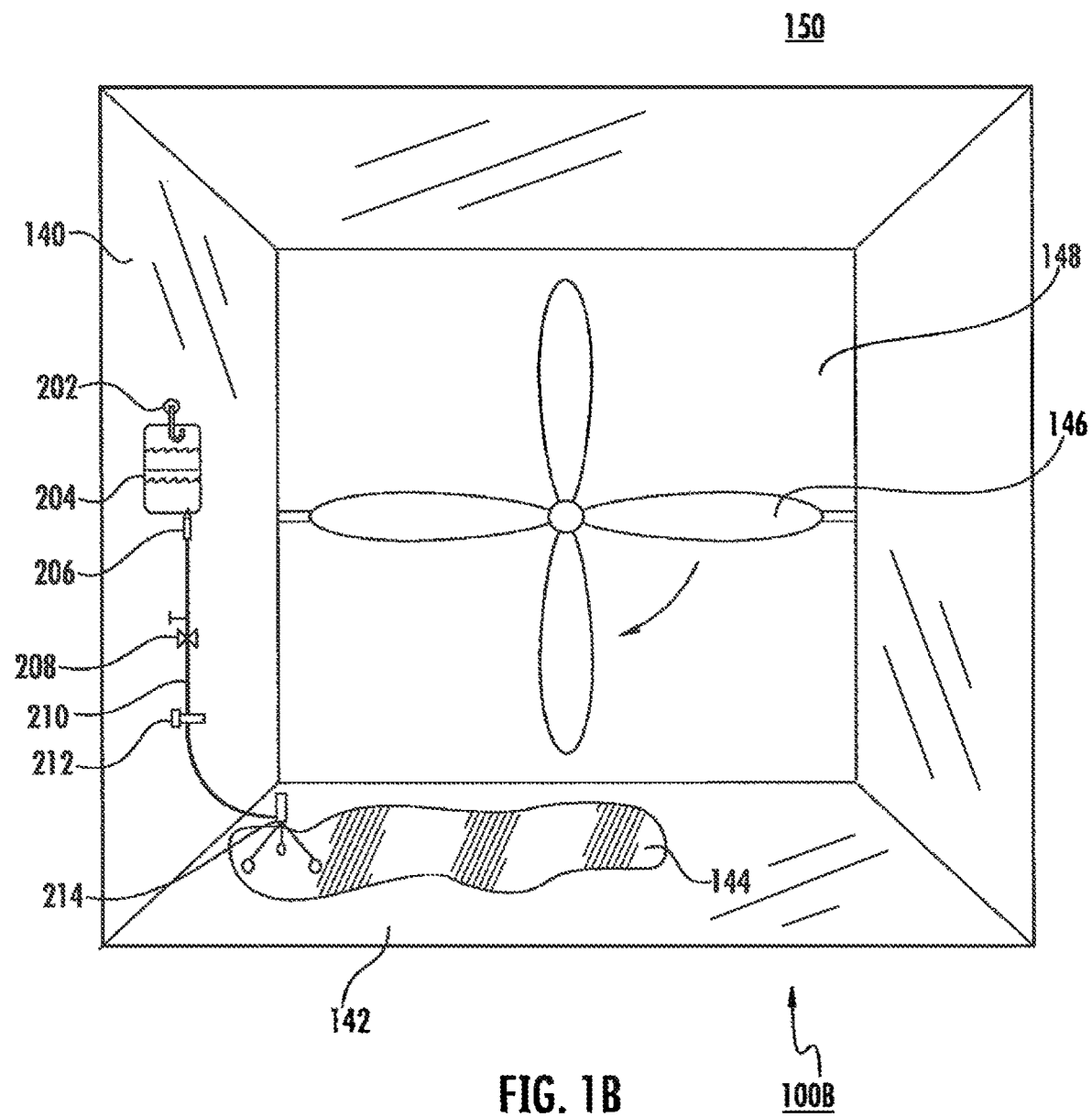
FIG. 1B is a diagram illustrating the fluid treatment system installed in an air handling compartment of an HVAC system, in accordance with embodiments of the present disclosure.
Figure 2:
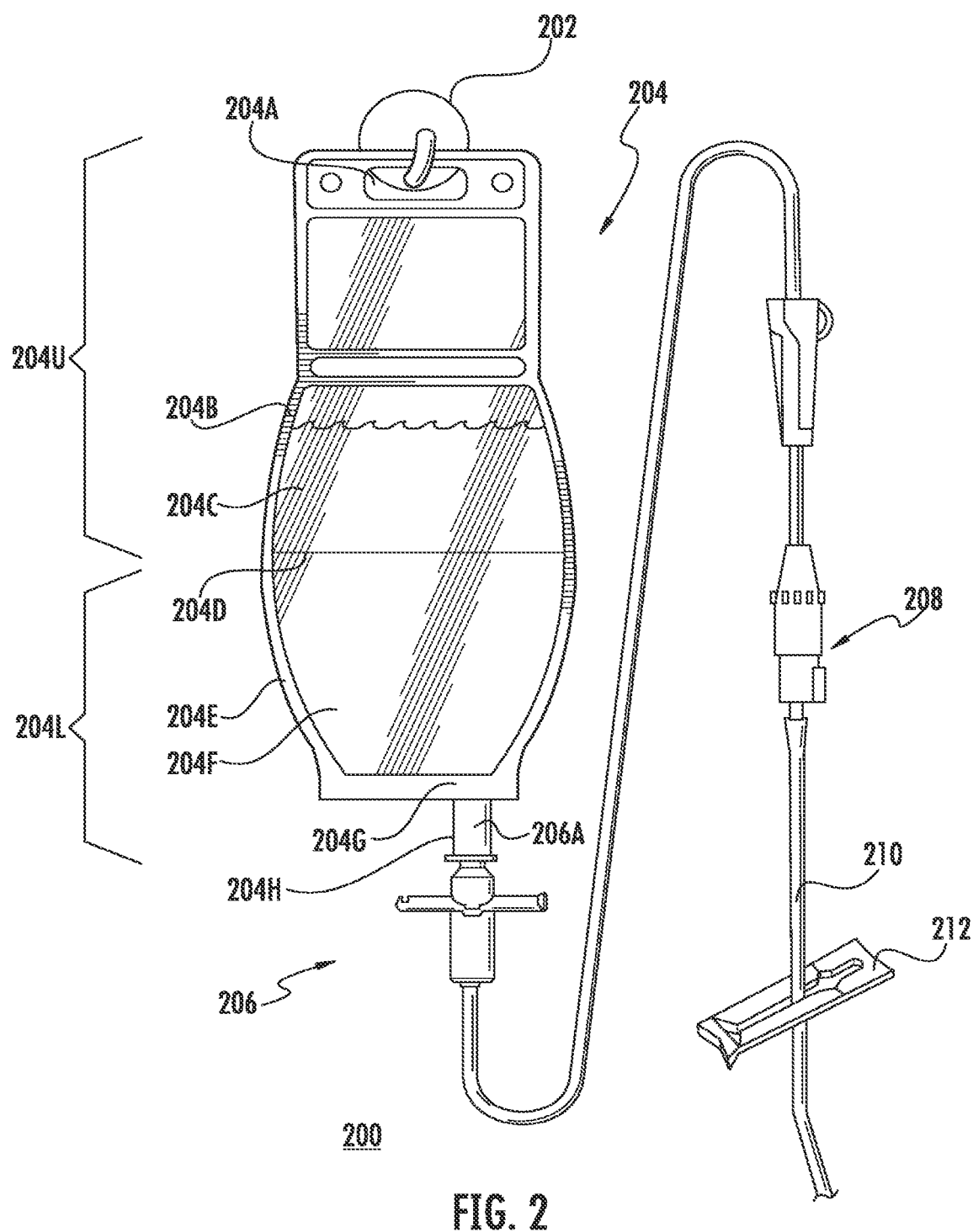
FIG. 2 is a diagram of the fluid treatment system of FIGS. 1A, 1B, and 1C.

An example of the fluid treatment system 200 is depicted in FIG. 2 and includes a fluid container support 202 which couples a fluid container 204 to a surface, e.g., the cooling tower surface 106 (FIG. 1A) or the air handling system compartment surface 140 (FIG. 1B). The fluid container 204 is in fluid connection with a fluid connector 206. A valve 208 allows users to control the flow rate of the fluid from the fluid container 204 and prevent discharge of the fluid until installation of the fluid treatment system 200 is complete. In embodiments, the valve 208 may be a check valve such as, without limitation, a ball check valve, swing check valve, disc check valve, split disc check valve, diaphragm check valve, water check valve, and the like. The check valve may be configured to prevent "backing" or reverse flow of fluid (e.g., the transmission of the standing fluid 144, which may be contaminated) into the fluid container 204 or the components along the fluid path from the standing fluid 144 to the fluid container 204. The valve 208 may also be used to permit periodic dosing of chemical agents from the fluid treatment system 200. For example, the valve 208 may be a metering valve configured to dose or otherwise allow for the transmission of fluid from the fluid container 202 out of the fluid treatment system toward the standing fluid 114 when a certain pressure is exerted on the valve 208 (e.g., when enough fluid is in the container to create enough pressure to engage the valve 208). In embodiments where one or more valves 208 are incorporated into the fluid treatment system 200, and at least one metering valve is used, the fluid stored in the fluid container 204 may be released into the area containing standing fluid 144 at a predetermined rate, thereby ensuring a certain range in which dosing may be performed by the fluid treatment system 200. In embodiments, when in a closed position, the valve 208 may permit relocation of the fluid treatment system 200 without unnecessary loss of the fluid contained therein. The hose 210 may be supported at an intermediate location or locations by one or more intermediate support members 212. The hose 210 is optionally maintained above fluid e.g., cooling fluid in the tower sump 112 (FIG. 1A) or standing fluid 144 in the air handling compartment 100B (FIG. 1B) by a hose end support member 214 (see e.g., FIG. 1B).

Referring again to FIG. 1A, the fluid container 202 is operably fastened to the cooling tower surface 106 by a fluid container support 202. The hose 210 may additionally be fastened directly to the cooling tower surface 106 with the intermediate support member 212. Connection of the hose 210 at multiple points, e.g., the connection via multiple intermediate support members (not shown) may prevent the fluid treatment system 200 from detaching from the fluid container 204, the fluid connector 206, or any other component of the fluid treatment system 200. More particularly, connection of the hose 210 at multiple points may prevent inadvertent disconnection of the fluid treatment system 200 from environments in which the fluid treatment system 200 is installed. By coupling the fluid container 202 and the hose 210 to the cooling tower surface 106, the fluid treatment system 200 is fixed in the cooling tower in such a way as to prevent the fluid treatment system 200 from interacting with components of the cooling tower/condenser 102, or falling into the tower sump 112.

Similar to the system illustrated in FIG. 1A as shown in FIG. 1B, the fluid container 202 is operably fastened to the compartment surface 140 by the fluid container support 202. The hose 210 may additionally be fastened directly to the compartment surface 140 with one or more intermediate support members 212. Both the fluid container support 202 and the intermediate support member 212 work to support the hose 210 within the air handling compartment 100B. By coupling the hose 210 to the compartment surface 140, the hose 210 is located and fixed in such a way as to prevent interaction of the hose 210 with air handling system components, such as the fan 146. The intermediate support member 212 also permits users installing the fluid treatment system 200 to route the hose 210 in a variety of alternate configurations in the air handling compartment 100B as may be needed or desired. Both the fluid container support 202 and the intermediate support member 212 may be magnetic, allowing for convenient and simple affixation to the compartment surface 140 of the air handling system.

Figure 1C:
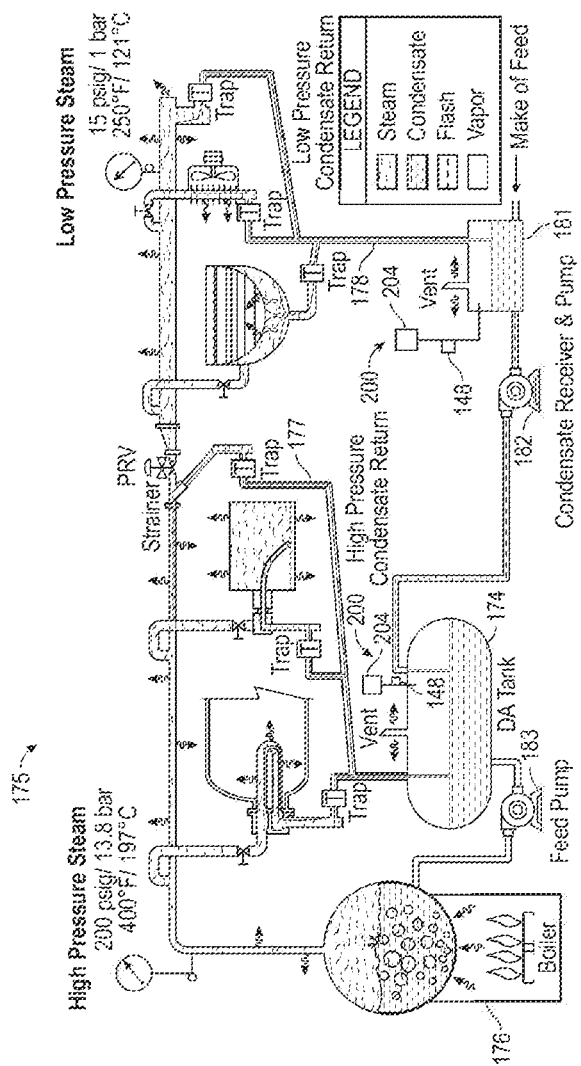
FIG. 1C illustrates fluid treatment system installed on a boiler (steam or hot water) system, in accordance with embodiments of the present disclosure.

A further application of the present disclosure is depicted in FIG. 1C wherein the fluid container 202 is connected to a boiler system. In FIG. 1C, a steam system 175 is depicted. This disclosure is not limited to a steam boiler system but rather any water/fluid circulation system where corrosion, scale and deposition may be a concern. The steam system 175 includes a boiler 176 which receives heat from the burning of one or more fuels (e.g., natural gas, oil, wood chips, etc.) to elevate the temperature and pressure of the water within the boiler above its vaporization point to convert the water to steam. At the increased pressure and temperature, the steam is able to do work including driving turbines for power generation, heat facilities, provide steam for cooking and preserving food stuffs, and drive machinery, among many others. As these tasks are performed, thermal energy is transferred from the steam (the temperature and pressure of the steam is reduced) and ultimately the steam condenses back into water.

In the system 175 there are two condensate returns 177 and 178 where the condensed water is collected. The condensate return 177 supplies a de-aerating tank 179, from which a feed pump 180 returns the condensate to the boiler 176 to repeat the process. The second condensate return 178 supplies a receiver 181. The receiver 181 can also receive make-up feed water from a source such as a water main or other supply. A feed pump 182 draws condensate and make-up feed water from the receiver 181 and pumps it to the de-aerating tank 179 from which the condensate is ultimately fed to the boiler 176.

A fluid treatment system 200, as described in greater detail herein (FIG. 2) may be configured to dose one or more chemical agents to both the receiver 181 and the de-aerating tank 179. The fluid treatment system 200 may optionally include a metering pump 148 for controlled dosing of the steam system 175, depending on the needs of the particular steam system 175. As will be appreciated, there is generally little need to treat bacterial and viral pathogens (e.g., Legionella), slime, algae, fungi, microorganisms, and other organisms which may cause harm to the health of an individual in a boiler application, though such organisms might be found in either the receiver 181 or the de-aerating tank 179. Instead, the fluid treatment system 200, when installed in connection with the system 175, is better used to supply inhibitors such as phosphates, tannin, and polymers to reduce the scale, deposits, and corrosion on the boiler 176 and associated components of the connected steam system 175. Examples of chemical agents that act as inhibitors include, without limitation, alkyl phosphonate salts, carboxylic acids, benzotriazole, zinc phosphate, tannic acid, zinc salts, benzalkonium chloride, and the like.

Though described herein with respect to a steam system 175, similar systems that employ hot water may also be equipped with a fluid treatment system 200 (e.g., baseboard home or commercial heating systems and the like). Again, the fluid treatment system 200 may be used to treat feed water, either returning from doing work or make-up feed.

Still further, though described in connection with an open system 175, the steam or hot water system may be a closed loop system. In such a scenario, the chemical supplied by the fluid treatment system 200 may be pressurized by a pump, such as metering pump 148 to bring the chemical treatment to a similar pressure as the operating pressure for the closed loop system. Once pressurized, the fluid dispersed by the fluid treatment system 200 is dispersed into the de-aerating tank 179.

Though depicted as employing metering pumps 148, the fluid treatment systems 200 as depicted in FIGS. 1A-1C, may be positioned in a manner permitting gravity feeding (downward flow) of fluid from the fluid container 204 toward the tower sump 112, the compartment basin 142, the receiver 181, or the de-aerating tank 179. As fluid passes through the fluid treatment system 200, the fluid is drawn from the fluid container 204 by gravity and is fed through the fluid connector 206 to the hose 210, ultimately exiting the hose 210 and released into the tower sump 112 or other locations.

Support of the hose 210 above the surface of the cooling fluid 114 (FIG. 1A) or the standing fluid 144 (FIG. 1B) by a hose end support member 214 permits transmission of the fluid without impedance by the cooling fluid 114 or the standing fluid 144 while maintaining the system's sanitary status overall. It will be understood that the hose 210 may be partially or completely formed of a rigid material (e.g., high-density polyethylene (HDPE), polyvinyl chloride (PVC), steel, aluminum, or other known alloys) capable of enabling fluid transfer.

FIG. 2 illustrates a detailed view of a portion of the fluid treatment system 200, supported by a fluid container support 202. The fluid container 204 defines two separate regions, a first region 204U and a second region 204L. In accordance with at least one embodiment, the first region 204U and the second region 204L may store separate materials therein. The separate materials stored in the first region 204U and the second region 204L may be stored and transported separately until they are required for use, at which time a membrane 204D may be breached, thereby allowing the materials (e.g. an active chemical agent and a carrier) to mix and be ready for use. Alternatively, the two materials may be precursor agents, which when mixed form the additive substance useable for the treatment of cooling fluid (FIG. 1A) or standing water (FIG. 1B).

The first region 204U may also include a hanging opening 204A designed to receive the fluid container support 202. It should be appreciated by one skilled in the art that the hanging opening 204A may be located at any place on the fluid container 204. Further, it is contemplated that more than one hanging opening 204A may be included in the fluid container 204.

At the base of the fluid container 204 is a port 204H which permits fluid communication through a lower portion of a fluid container surface 204E. The port 204H may further contain a seal 204G which is independent of the lower portion of the fluid container surface 204E. Alternatively, the port 204H may be included as a portion of the fluid container surface 204E, 204B.

The fluid connector 206 as depicted in FIG. 2 is in fluid connection with the port 204H. The fluid connector 206 may include a spike 206A which is formed to puncture seal 204G and permit fluid communication between the fluid container 204 and the hose 210 which is connected to the fluid connector 206. The fluid connector 206 may be fixed to the port 204H via a threaded connection (e.g. a luer lock), fuse seal, friction fit, mechanical connection, or any other such suitable method of connection.

Figure 3A:
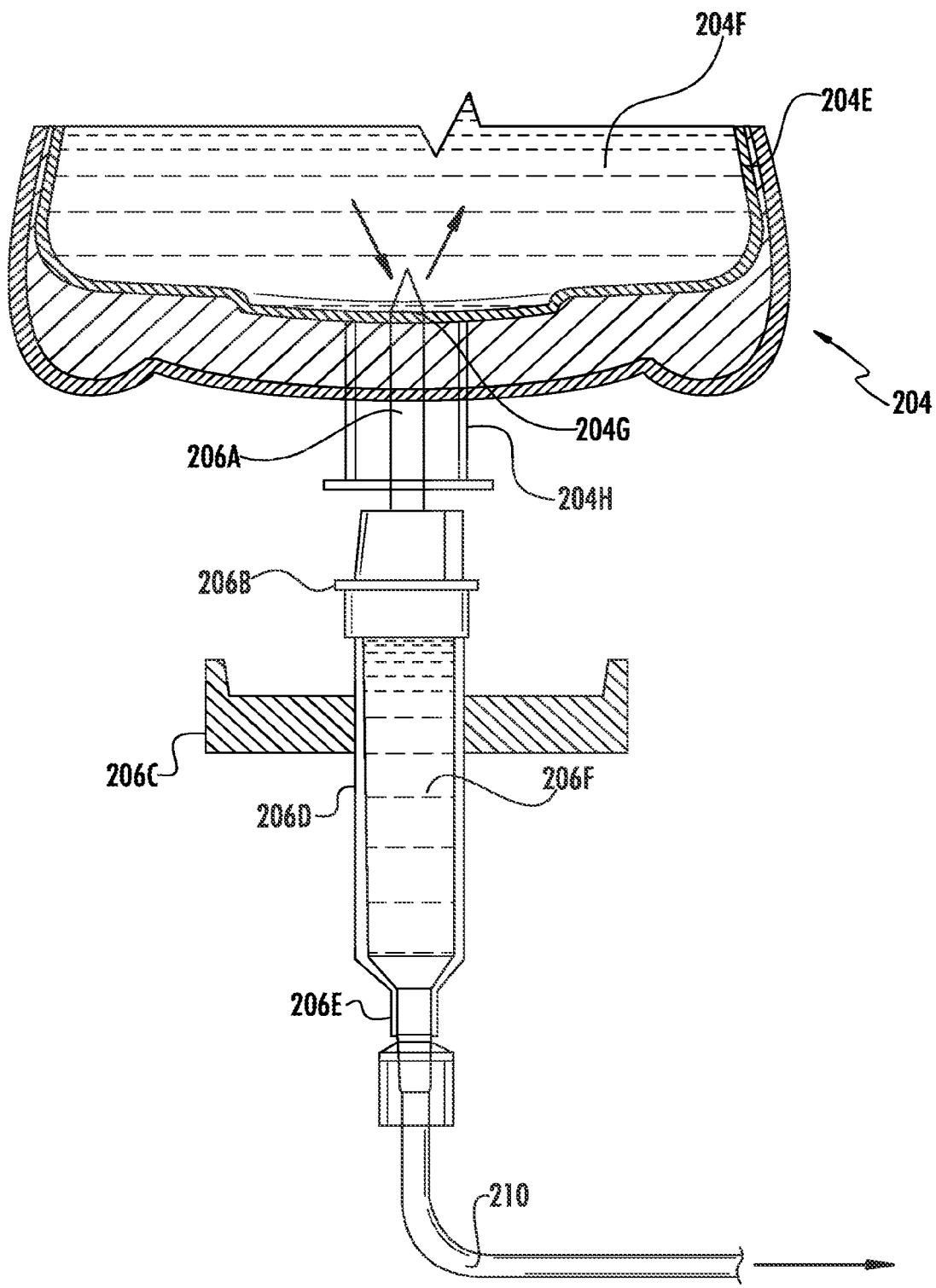
FIG. 3A is a diagram illustrating a partial view of a subset of components illustrated in FIG. 2.
Figure 3B:
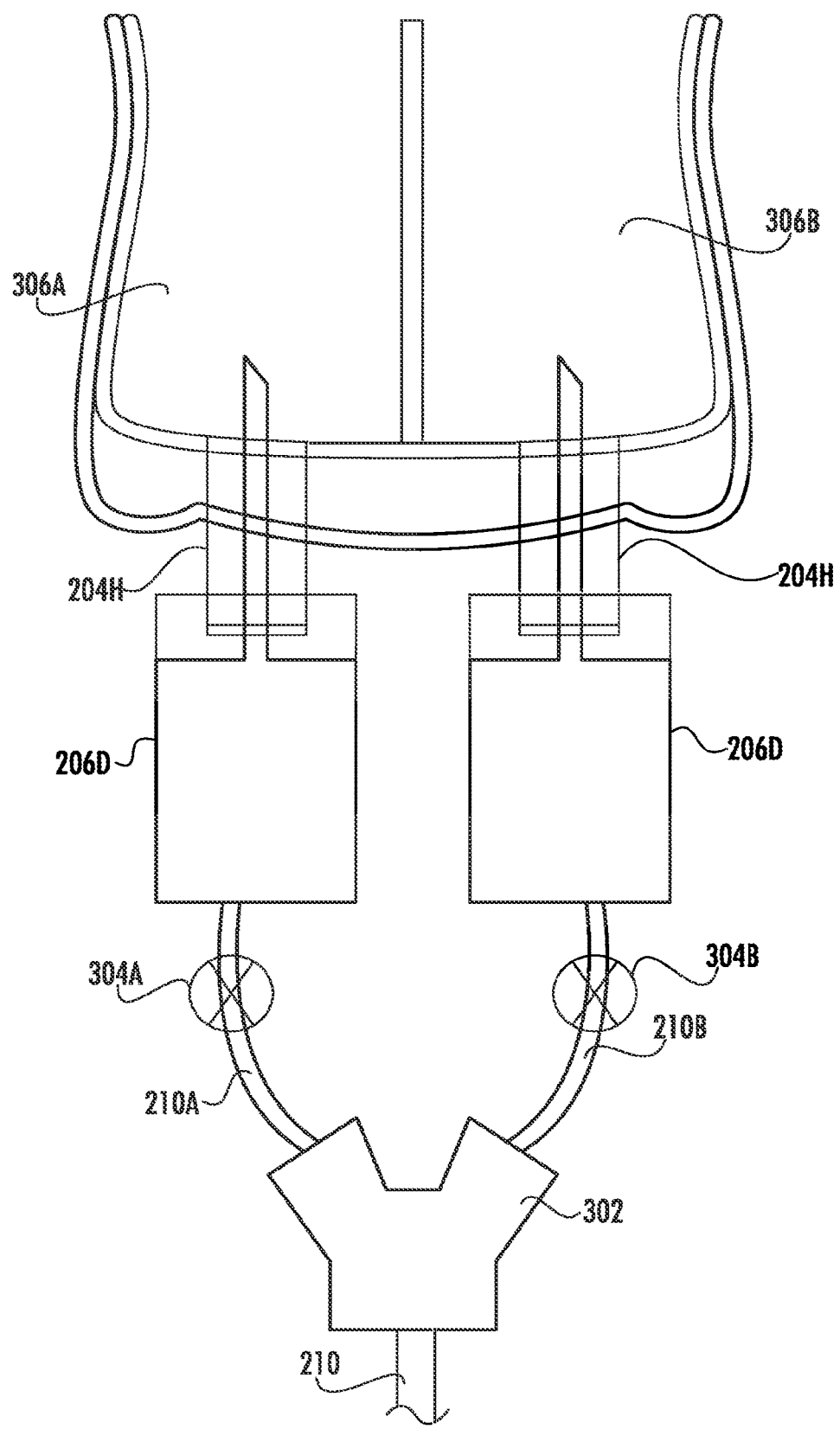
FIG. 3B is a diagram illustrating a partial view of another embodiment of a subset of components illustrated in FIG. 2.

The fluid connector 206 depicted in FIGS. 3A and 3B are also in fluid connection with a hose 210. The hose 210 may be fixed to the fluid connector 206 via a threaded connection, or may be permanently fused thereto to prevent separation during the set-up of the fluid treatment system 200. Similarly, the connections to the V-connector may be permanent or via a threaded or luer lock type connection. The hose 210 may also be connected to the intermediate support member 212. In the illustrated embodiment, the hose 210 passes through the intermediate support member 212 and maintains connection with the intermediate support member 212 after being wedged along the support member opening 212D, the support member opening 212D defining two tapered edges and allowing for varying application of pressure on the hose 210, which, depending on the amount of pressure applied, may crimp the hose 210 completely, thereby preventing flow of fluid from the fluid container 204 from continuing through the hose 210.

Fluid connector 206 as depicted in FIG. 3A may include a chamber 206F. The chamber 206F may include a lumen configured to receive a regulator (not shown) or may alternatively permit uninhibited flow of fluid. Fluid connector 206 also includes an annular flange 206C which enables an individual to grip the fluid connector 206 when either attaching or removing the fluid connector 206 to or from the fluid container 204.

FIG. 3A illustrates the connection between fluid container 204, fluid connector 206, and hose 210. In the illustrated embodiment, the fluid container 204 is in fluid connection with a fluid connector 206. The port 204H is designed to receive a spike 206A which is attached to the fluid connector 206. The spike 206A may be attached to the fluid container via friction-based connection at the seal 204G, which simultaneously provides a fluid seal around the spike 206A. The spike includes a spike lumen 206B (see FIG. 4) which permits fluid communication between the fluid container 204 and the fluid connector 206 there through. As illustrated fluid may travel from the fluid container 204 through the spike 206A via the spike lumen 206B (see FIG. 4) to the chamber 206F, the chamber 206F enclosed by the fluid connector surface 206D, then to the hose 210.

FIG. 3B illustrates an alternative arrangement. As illustrated the fluid connector 206 may include two separate fluids which can be individually titrated to achieve a desired concentration or a mixture of chemistries. This may be particularly useful when the combination results in a volatile or reactive composition that is effective for treatment but might have a short effective period following mixture. In such embodiments, the first and second fluid chambers may separately connect to ports or fluid connectors. As depicted in FIG. 3B, such a configuration may include separate valves 304A-304B which control the flow of fluid to the hose 210. The hoses 210A-210B may be connected via a Y-connector or the like. In this manner fluid flow from each fluid chamber 306A-306B can be confirmed before mixing of the fluids in the Y-connector to prevent losses and minimize waste. As shown, the valves 304A-304B are located between the fluid connectors and the Y-connector. Valves may, alternatively, be formed on the ports, or on the inlet side of the fluid connector.

FIG. 4 illustrates a cross-sectional view of a fluid connector 206 including a flow indicator 206K. The fluid connector 206 includes a spike 206A, the spike defined by a spike lumen 206B which traverses the length of the spike 206A, a chamber 206F in fluid connection with the spike 206A and containing the flow indicator 206K, and an exit port 206H. The exit port may be in fluid communication with the hose 210, thereby permitting fluid communication from the chamber 206F to the hose 210. When the fluid pressure outside the spike 206A is greater than fluid pressure inside the spike 206A, fluid is forced through the spike lumen 206B into the chamber 206F, past the flow indicator 206K and out through the exit port 206H, into the hose 210.

As illustrated in FIG. 4, the exit port 206H may include an annular flange 206J to assist an individual gripping the fluid connector 206 while connecting to the hose 210. Further, the fluid connector 206 may include a fluid connector cap 206E which permits removal of an optional flow indicator 206K, illustrated further in FIG. 5. It should be noted that a fluid connector 206 may be made of one continuous piece rather than a series of components as illustrated.

FIG. 5 illustrates a flow indicator 206K which consists of a cylindrical member 206M and a lumen there through defining a longitudinal axis. The flow indicator also has at least one blade 206N which may be angled to direct the flow of fluid as the fluid passes around and through the cylindrical member 206M. As a result of the fluid flow over the blades 206N the flow indicator 206K rotates about the longitudinal axis at varying speeds, depending on the flow rate of the fluid passing through the chamber 206F. Additionally, by virtue of the direction which fluid flows past the flow indicator 206K, backflow may be detected (e.g., rotation of the flow indicator 206K may be associated with flow of fluid in a first direction away from the fluid container 204, and rotation in a second direction may be associated with flow of fluid in a second direction "backward" or toward the fluid container 204).

Figure 6:
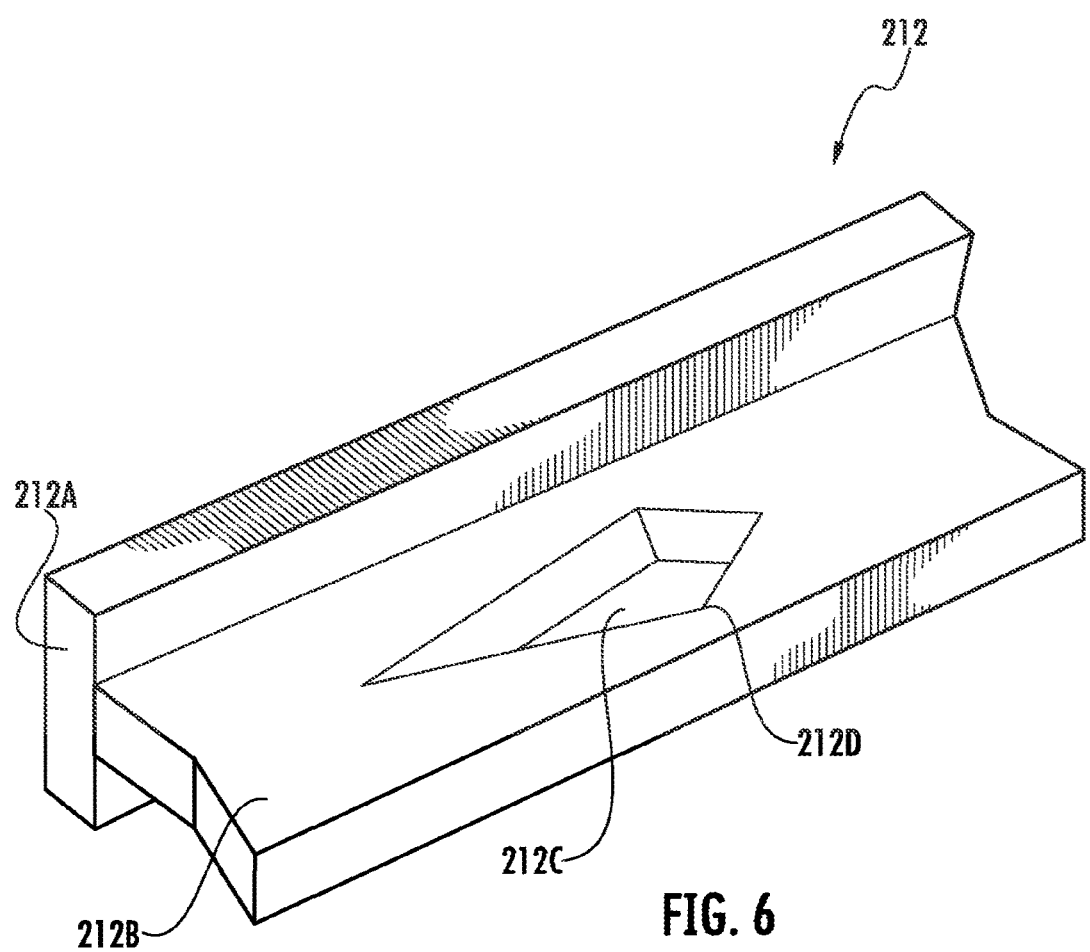
FIG. 6 is a diagram illustrating the intermediate hose support of FIG. 2.

FIG. 6 illustrates an exemplary embodiment of an intermediate support member 212. The intermediate support member 212 includes a back 210 which may be made of a magnetic material to enable the securing of the intermediate support member 212 to a metal surface, as well as a support surface 212E which includes support member opening 212D. As illustrated in FIG. 6, the support member opening 212D allows for communication through the intermediate support member 212, with the support member opening 212D defining a cavity 212C. The cavity 212C as illustrated in FIG. 6 is widest near the center of the intermediate support member 212 and tapers off as the cavity 212C approaches the ends of the intermediate support member 212. The tapering of the cavity 212C allows for a hose 210 to be wedged between the two sides of the cavity 212C, which may in turn reduce or halt the flow of fluid through the hose 210. It will become apparent to an individual skilled in the art that an intermediate support member 212 need not be implemented as illustrated, but rather may be implemented in a variety of ways, such as with a hook, channel, or other technique which permits securing the hose 210 to a metal surface, or other such surface. Though described herein as being magnetic the intermediate support member 212 may also be secured to the compartment surface 140 using temporary or permanent adhesives, hook and loop fasteners (either with or without adhesives, rivets, bolts, and other known securing systems.

Figure 7:
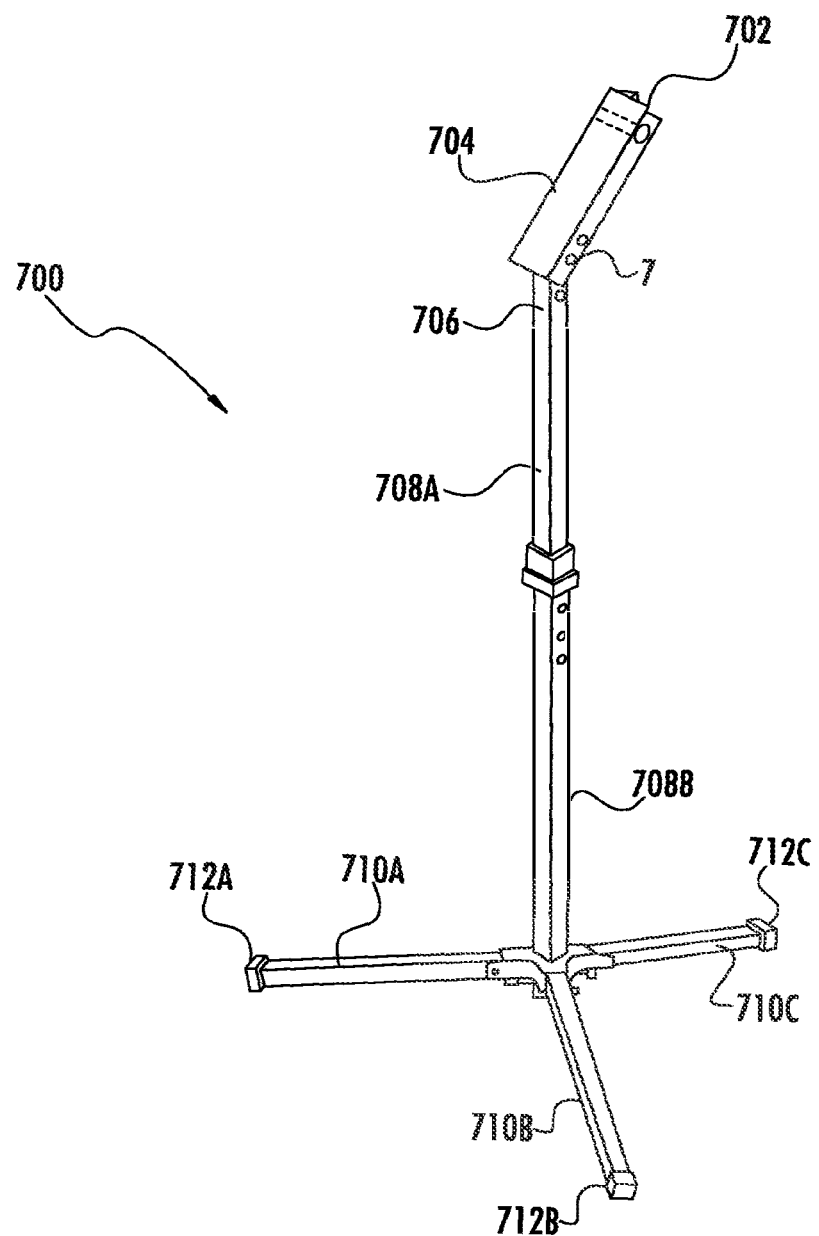
FIG. 7 is a diagram illustrating an exemplary embodiment of system support member.

FIG. 7 illustrates an embodiment of a fluid treatment system support member 700. The fluid treatment system support member 700 includes at an upper vertical support member 708A and a lower vertical support member 708B. As illustrated, the fluid treatment system support member 700 includes three base support members 710A-710C. The three base support members 710A-710C are connected to a lower vertical support member 708B. The lower vertical support member 708B may additionally be connected to the upper vertical support members 708A, as illustrated in FIG. 7. The lower and upper vertical support member 708A-708B may be configured to receive a fluid container 204 thereon, specifically a hanging opening 204A of the fluid container 204. The vertical support members 708A-708B are connected to a container attachment 704 capable of supporting a fluid container 204 by receiving the hanging opening 204A. The container attachment 704 may be fixed in relation to the upper vertical support member 708A, or may pivot about at least one axis.

The apparatus illustrated in FIG. 7 includes support member footings 712A-712C which are attached to the base support members 710A-710C. The support member footings 712A-712C may be attached to the base support members 710A-710C with a fastener, adhesive compound. Additionally, or alternatively, the support member footings 712A-712C may be fitted to the base support member 710A-710C and held in place by tension or friction exerted by the support member footing 712A-712C against the base support member 710A-710C.

Further illustrated in FIG. 7, the base support members 710A-710C may be made of materials suitable for contact with a hard surface, as well as fluids which may be corrosive or prone to containing minerals which can be harmful to the base member's material. As such, it will be apparent to one skilled in the art that the body of the fluid treatment system support member 700 may be made of any non-corrosive metal, such as stainless steel, or may alternatively be a corrosive metal which is coated or otherwise galvanized to prevent corrosion. Likewise, the support member footings 712A-712C may be made of any non-metal substance, such as rubber, or alternatively may be made of a magnetic substance.

Figure 8A:
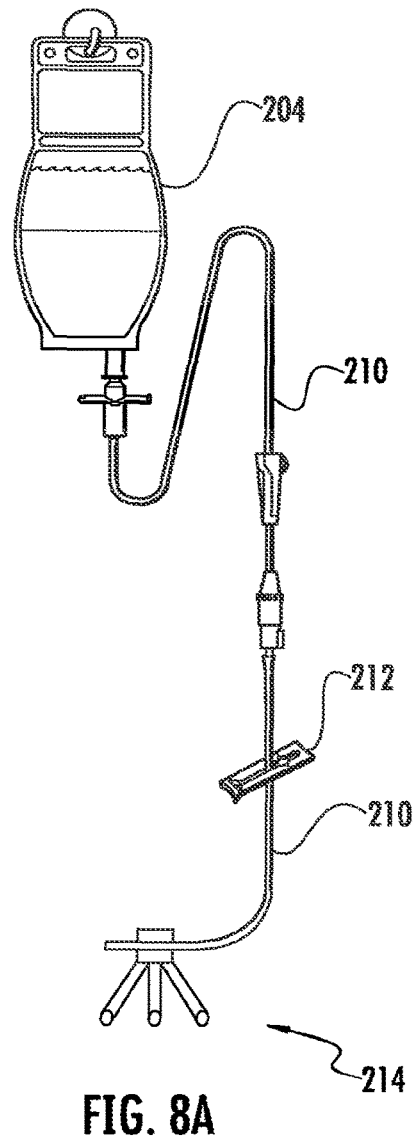
FIG. 8A is a diagram illustrating the passive dosing system for treating standing fluid in an HVAC system of FIG. 2, including the intermediate hose support of FIG. 6 and a hose end support member.

FIG. 8A illustrates an embodiment of a hose end support member 800 illustrated in earlier figures as hose end support member 214 (FIGS. 1A and 1B). Hose end support member 800 includes at least two base support member legs 806A-806B, though illustrated with three base support member legs 806A-806C. The base support member legs 806A-806C may be fixed to the hose attachment 812 which in turn can be fixed to an air handling compartment 100. The base support member legs 806A-806C may be fixed to the hose attachment 812, or alternatively may pivot along at least one axis to adapt the hose end support member 800 to an air handling compartment 100.

The base support member legs 806A-806C may include magnetic components to secure them to the air handling compartment 100. Alternatively, the base support members 806A-806C may be connected to base support member footings 808A-808C, which may be comprised of a magnetic substance. By constructing either the base support member legs 806A-806C or the base support member footings 808A-808C of a magnetic substance, the hose end support member 800 may be fixable within an air handling compartment 100, either at the compartment basin 104, or alternatively on a side of the compartment if such side is metallic and capable of fixable connection with a magnetic substance.

Figure 8B:
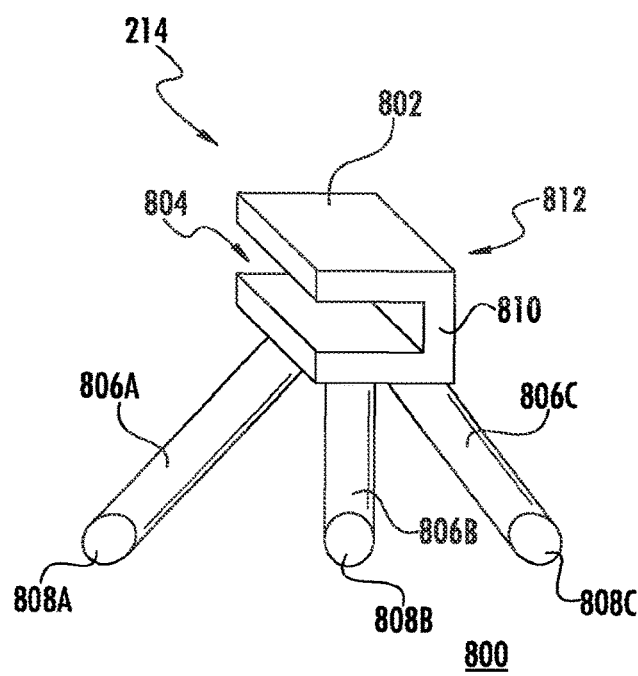
FIG. 8B is a diagram illustrating an exemplary embodiment of the hose end support member illustrated in FIG. 8A.

The hose attachment 812 as illustrated in FIG. 8B further includes a hose attachment enclosure 810 which wraps around a hose attachment cavity 804, permitting passage of a hose 210 through the hose end support member 800. The hose attachment enclosure 810 may be configured to receive a hose 210 of a designated width, or may be formed of different shapes which permit tapering of the hose attachment cavity 804, providing for compression-based fixation of a hose 210 to the hose attachment 812. As illustrated, the hose attachment enclosure 810 is comprised of a substance which is formed to create three sides, allowing for ingress and egress of a hose through the hose attachment cavity 804. The hose attachment 812 may also be flexible, allowing the hose attachment cavity 804 to be increased for insertion of a hose 210, and then owing to the elasticity of the material form which the hose attachment 812 is formed, return to the original shape to apply pressure on the hose 210 and secure the hose 210 thereto.

Figure 9:
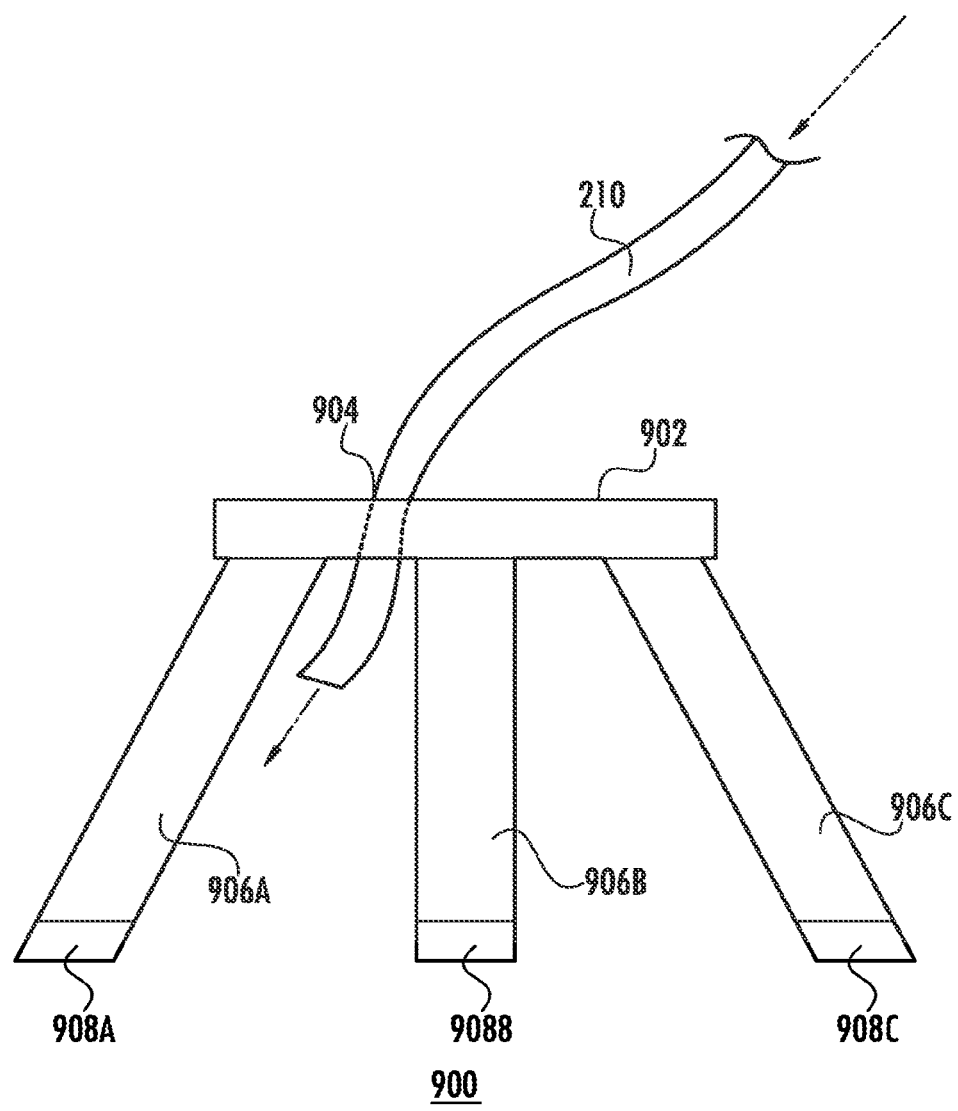
FIG. 9 is a diagram illustrating a further embodiment of a hose end support member.

FIG. 9 illustrates another embodiment of a hose support member 214. Illustrated in FIG. 9 is hose support member 900, which includes at least two base support member legs 906A-906B, though illustrated with three base support member legs 906A-906C. The base support member legs 906A-906C are attached to hose attachment 902. The base support member legs 906A-906C may be fixed to the hose attachment 902, or alternatively may be pivotable relative to the hose attachment 902 along at least one axis, permitting adaptation of the hose support member 900 to an air handling compartment 100B.

The base support member legs 906A-906C may be made of, or include, magnetic components such as ferromagnetic metals. Alternatively, the base support member legs 906A-906C may be connected to base support member footings 908A-908C which may also include magnetic components or otherwise include magnetic substances. By constructing either the base support member legs 906A-906C or the base support member footings 908A-908C of a magnetic substance, the hose support member 900 may be fixable within an air handling compartment 100, either at the compartment basin 142 or on a compartment surface 140, if either is capable of fixable connection with a magnetic substance.

The hose attachment 902 as illustrated in FIG. 9 further includes a hose attachment opening 904. The hose attachment opening 904 permits passage of a hose 210 through the hose attachment 902. The hose attachment opening 904 may be configured to receive a hose 210 of a predetermined width, or may be formed of different shapes which taper the hose attachment opening 904, thereby providing for compression-based fixation of the hose 210 to the hose attachment 902.

Figure 10:
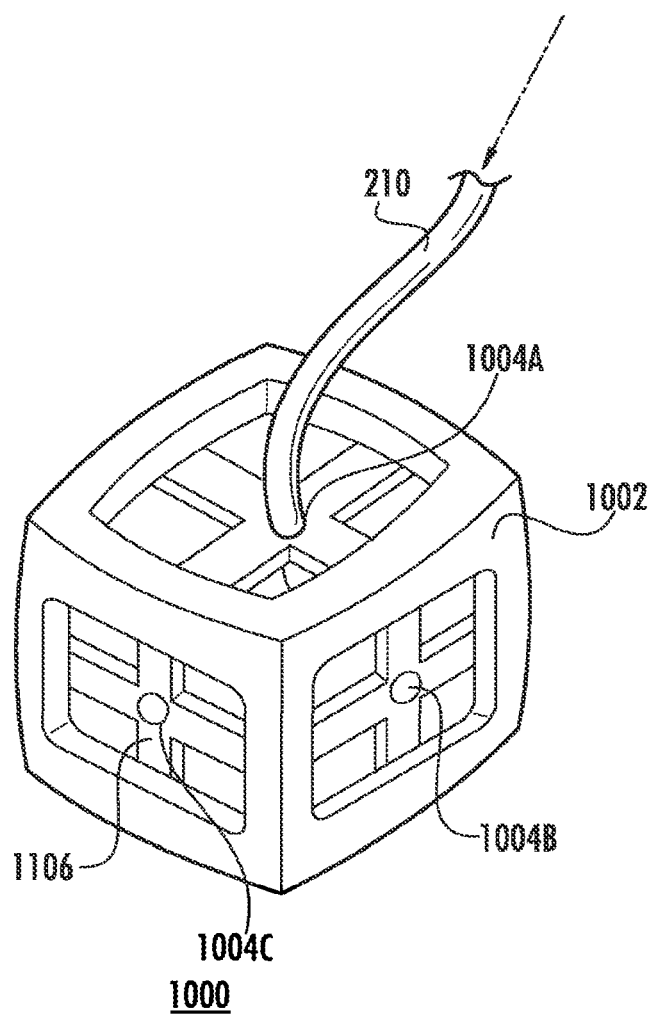
FIG. 10 is a diagram illustrating yet another exemplary embodiment of a hose end support member.

FIG. 10 illustrates an alternative tube end support member 214, here depicted as hose support member 1000. Hose end support member 1000 includes an exterior frame 1002, and an interior frame 1006. The hose 210 as illustrated is configured to be in fluid connection with an opening 1004A, and to be in fluid communication with the interior frame 1006, the interior frame including at least one lumen permitting fluid ingress and egress. The interior frame 1006 of the hose end support member 1000, as depicted in FIG. 10, allows for multiple paths of egress via openings 1004A-1004B. One significant benefit of the interior frame 1006 is that the openings 1004A-1004C create multiple points of egress for fluid, thereby reducing the chance of clogging or complete operational obstruction of the fluid path through the hose end support member 1000 should one or more of the openings 1004A-1004C be obstructed by a foreign object (not shown).

In addition, the exterior frame 1002 may be made of a buoyant material or have a buoyant construction (e.g. entrapping air within the frame or be constructed of materials such as Styrofoam, etc., which have a lesser density than the fluid being dosed or treated) to enable the hose end support member 1000 to float on the fluid being dosed or treated, thereby ensuring that at least one of the openings 1004A-1004C are always above the surface of the standing water. This embodiment further reduces the chance of clogging, and additionally promotes wider disbursement of the anti bacterial and anti-viral chemistries used by the fluid treatment system 200.

Figure 11:
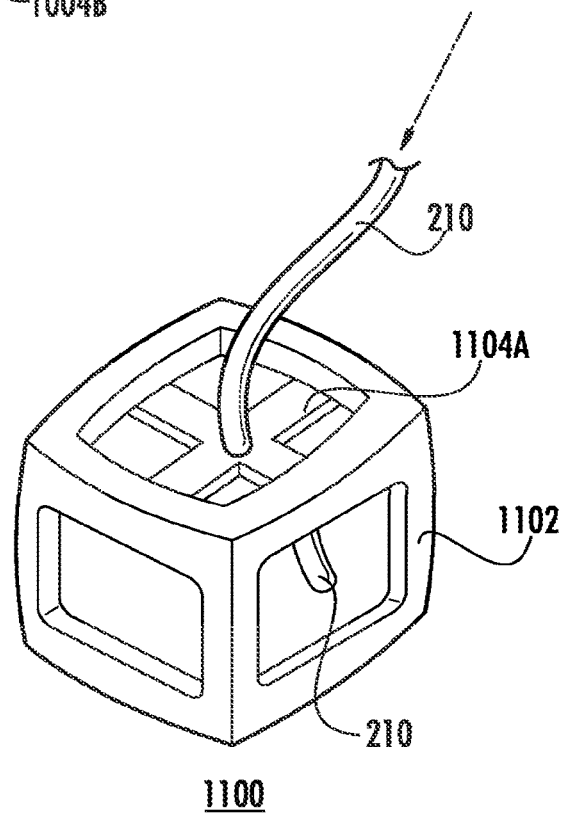
FIG. 11 is a diagram illustrating still a further exemplary embodiment of a hose support member.

FIG. 11 illustrates an alternative embodiment of tube end support member 214. Illustrated in FIG. 11 is hose end support member 1100. As illustrated, hose end support member 1100 includes an exterior frame 1102 which is designed to receive a hose 210 through a hose opening 1104. As shown in FIG. 11, the hose end support member 1100 simply receives the hose 210, and the anti-bacterial and anti-viral solutions flow directly to the standing water without further spread through lumens in the structure as depicted in FIG. 10. In both instances the non linear construction of the hose end supports 1000-1100 prevents the end of the hose 210 from being submerged below a surface of the cooling fluid 114 or the standing fluid 144, thereby increasing the chance of effective dispersion of biocides from the fluid treatment system 200.

Figure 12A:
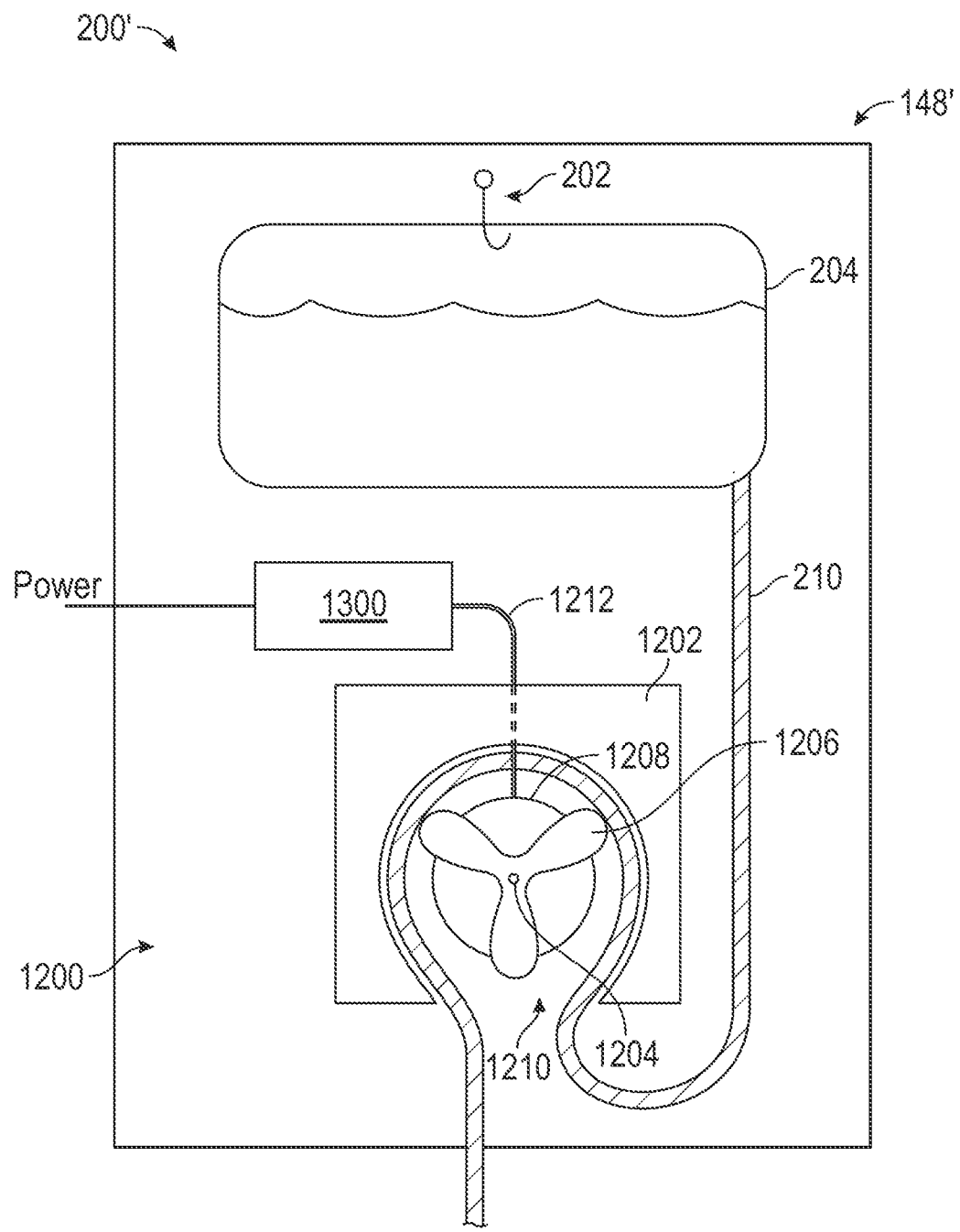
FIG. 12A is a diagram illustrating an embodiment of a fluid treatment system according to aspects of the present disclosure.

FIG. 12A illustrates select components of a fluid treatment system 200' in accordance with embodiments of the present disclosure. The fluid treatment system 200' includes a metering pump 148' disposed within a housing that may be coupled to an object or surface for delivery of chemical agents to standing fluid (e.g., see FIG. 1A). The metering pump 148' includes a fluid container 204 suspended from the housing, the fluid container suspended from a fluid container support 202. As discussed earlier, the fluid container 204 may be filled with chemical agents or other liquids and/or compounds for delivery to standing or recirculating fluid to prevent growth of pathogens, buildup of material, and the like.

A tube 210 is coupled to a bottom portion of the fluid container 204 and allows for fluid communication of the chemical agents from the fluid container 204 there through. The hose 210 extends from the fluid container 204 through a positive displacement metering pump or pump 1200, and then through an aperture along a bottom portion of the housing of the fluid treatment system 200'. More particularly, the hose 210 extends away from the fluid container 204 toward and through a housing 1202 of the pump 1200. As the hose 210 passes through the housing 1202 of the pump 1200, the hose 210 is urged toward a periphery of a chamber 1210 within the housing 1202. The chamber 1210 has a rotor 1204 rotatably coupled to the housing 1202 and disposed centrally therein, the rotor 1204 having a plurality of arms 1206 extending radially outward from a center portion of the rotor 1204. Each arm 1206 may have a wheel (not explicitly shown) which is configured to press the hose 210 against the periphery of the chamber 1210. The wheels may be spaced such that a gap exists between each wheel, thereby enabling a precise amount of fluid to pass through the hose 210 between any two wheels at a particular time.

The rotor 1204 is rotatably coupled to a motor 1208. The motor 1208, in response to receiving signals and/or electrical energy from a controller 1300, may cause the rotor 1204 to rotate selectively, thereby causing a vacuum to form in the hose 210 and, ultimately, for fluid to flow from the fluid container 204 through the hose 210 toward standing or recirculating fluid (e.g., standing fluid 144). The controller 1300 may, in embodiments, cause rotation of the rotor 1204 at predetermined time intervals or periods, in response to receiving sensor signals (e.g., signals associated with manual input by an individual to the controller 1300 to cause the fluid treatment system 200, 200' to dose the standing and/or recirculating fluid, increases in the quantity of accumulated standing fluid to be treated, etc.), or any combination thereof. The controller 1300 may be coupled via a wire 1212 to the motor 1208, or may otherwise be in electrical communication with the motor (e.g., the controller 1300 and motor 1208 may be configured to be in wireless communication via one or more established wireless communication protocols).

Figure 12B:
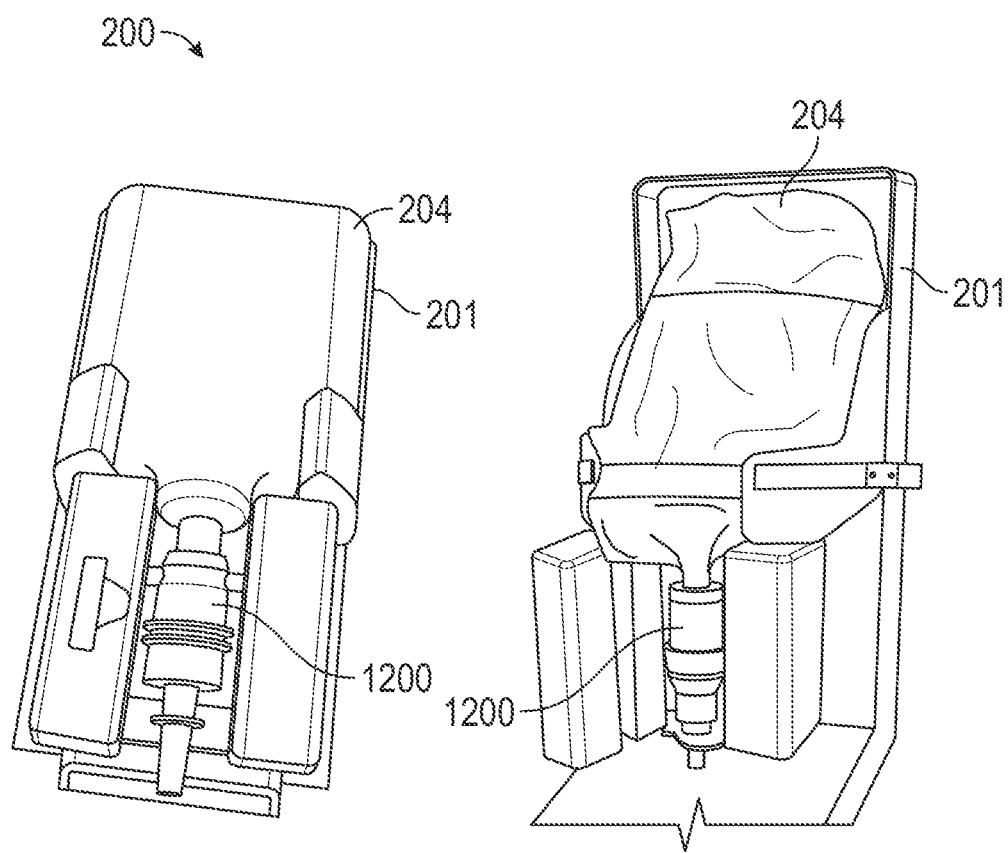
FIG. 12B is a diagram illustrating an embodiment of a fluid treatment system according to aspects of the present disclosure.

FIG. 12B depicts a further alternative design for a fluid treatment system 200. Like that shown in FIG. 12A, a positive displacement pump 1200 is utilized; however, in this instance the pump 1200 connected to a fluid container 204 and housed in a container 201. The pump 1200 operates much like what is found in common soap dispensers. A motor (not shown) drive a spring return style of pump which causes the fluid in the fluid container 204 to be released into an internal chamber of the pump 1200, often with a ball valve limiting the inflow to a predetermined amount. Fluid already in the chamber is forced out by the newly released fluid from the fluid container 204. In this way a metered volume of fluid can be released from the fluid container 204 to dose a desired location. The fluid treatment system 200 may include not just the motor, but also, a motor controller, a battery, power electronics for connection to electrical mains and conversion to DC for use by certain components, a communications system for network communications, and other features of fluid treatment system 200 and 200' as described herein. The fluid container 204 may be either a hard refillable bottle, or a more pliable single use bag, as shown in FIG. 12B. The pump 1200 may be integrated into the fluid container 204 as sold, or it may be a re-useable component that can be removed from the container 201 and the interface with the motor to be attached to a fluid container 204. If integrated, into the fluid container 204, refilling of the fluid treatment system 200 may be accomplished with little or no exposure to the chemicals contained therein. Alternatively, to save costs, the pump 1200 may be removed from the fluid container 204, refilled, and the pump 1200 reattached to the container 201. Further, a hose may be employed to connect the end of the pump to the fluid to be treated, as described elsewhere herein. The motor that drives pump 1200 may be connected to a controller which controls its operation.

Figure 12C:
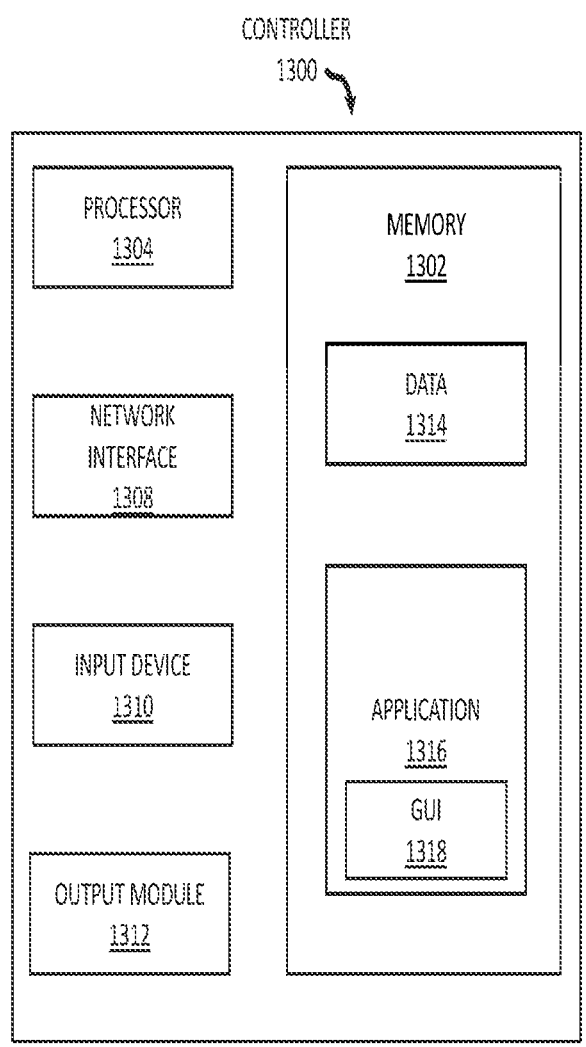
FIG. 12C is a diagram illustrating a controller according to embodiments of the present disclosure.

With reference to FIG. 12C, a controller 1300 for operation of fluid treatment systems system 200 and 200', and others described herein may include one or more memories 1302, processors 1304 that are in electrical communication with one or more network interfaces 1308, input devices 1310, and/or output modules 1312. The memory 1302 includes non-transitory computer-readable storage media for storing data and/or software that is executable by the processor 1304, and which controls operation of the controller 1300. In embodiments, the memory 1302 may include one or more solid-state storage devices such as flash memory chips. Additionally, or alternatively, the memory 1302 may include one or more mass storage devices connected to the processor 1304 through a mass storage controller and a communications bus (not explicitly shown). Although the description of computer-readable media contained herein refers to solid-state storage, it will be appreciated by those skilled in the art that computer-readable storage media can be any available media that can be accessed by the processor 304. That is, computer-readable storage media may include non-transitory, volatile, non-volatile, removable, and non-removable media implemented in any method or technology for storage of information such as computer-readable instructions, data structures, program modules, or other data. Examples of computer-readable storage media include RAM, ROM, EPROM, EEPROM, flash memory or other solid-state memory technology, CD-ROM, DVD, Blu-Ray, or other optical storage, magnetic cassettes, magnetic tape, magnetic disk storage or other magnetic storage devices, or any other medium which can be used to store the desired information and which can be accessed by controller 1300.

In embodiments, the memory 1302 stores data 1314 and/or an application 1316. The application 1316 may include a user interface component 1318 that, when executed by the processor 1314, causes a display device (or a remote display device in electrical communication with the controller 1300) to present a user interface (not shown). The network interface 1308, in embodiments, is configured to couple to the controller 1300 and/or individual or subsets of components thereof to a network, such as a wired network, a wireless network, a local area network (LAN), a wide area network (WAN), a wireless mobile network, a Bluetooth network, the Internet, and/or other network types. The input device 1310 may be any device in electrical communication various components of the controller 1300 configured to be interacted with by an individual. Examples of input devices 1310 include, without limitation, a mouse, a keyboard, a touch screen, a voice interface, and/or the like. The output module 1312 may, in embodiments, include any connectivity port or bus such as, for example, a parallel port, a serial port, a universal serial bus (USB), or any other similar connectivity port known to those skilled in the art.

Power for the fluid treatment system 200', the controller 1300, network interface 1308, and pump 1200 may be provided via a battery, e.g., a lithium ion battery (not shown)

that may be electrically connected to a solar panel (e.g., 149 in FIG. 1) to charge the battery. Alternatively, power may be provided by a mains connection.

Figure 13:
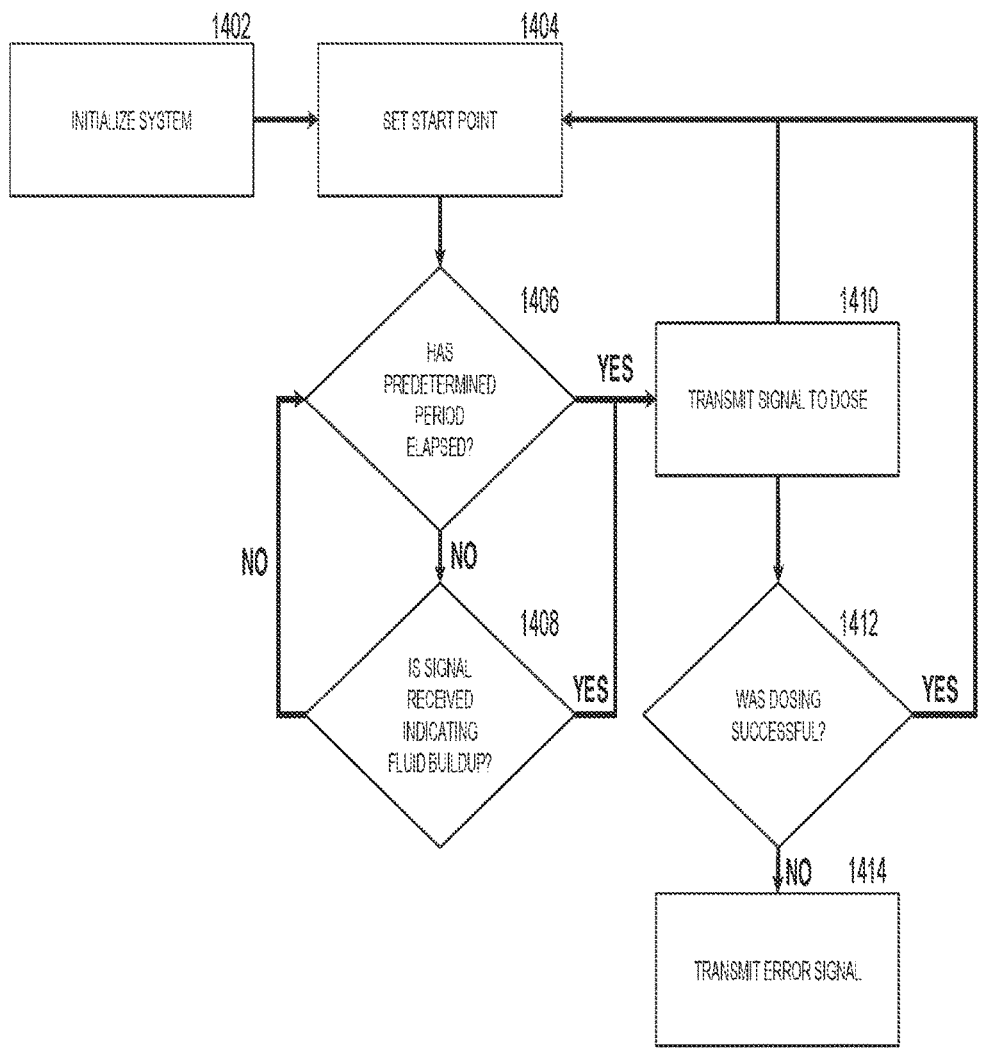
FIG. 13 is a flow diagram illustrating a method of dosing according to embodiments of the present disclosure.

Referring now to FIG. 13, a flow diagram is illustrated of a method of dosing and generally referred to as process 1400. While process 1400 is described as associated with the execution of instructions in the memory 1302 of the controller 1300 of FIG. 12C, it will be understood that process 1400 may be applied on a variety of systems consistent with the present disclosure, and as such, should not be limited to any particular embodiment. Further, it will be understood that, while process 1400 includes various steps described in a particular sequence, the described steps may be performed in a different order, repeated, and/or omitted without departing from the scope of the present disclosure.

Initially, a controller 1300 in electrical communication with a metering pump (e.g., metering pump 148') may execute instructions which cause the metering pump 148' to initialize (block 1402). During initialization, the controller 1300 may receive input from an individual (e.g., from an input device 1310) and, based on the input, set one or more operating parameters to control dosing performed by fluid treatment systems (e.g., fluid treatment system 200 and/or 200'). For example, the controller 1300 may receive input indicating that dosing or metered dispensing of fluid should be performed every half-hour, hour, half-day, etc. Additionally, or alternatively, the controller 1300 may receive input indicating that a predetermined concentration of chemical agents should be dosed (e.g., 1 mL/1 L of a chemical agent, etc.) If no input is received, the controller 1300 may set default parameters as the operating parameters (e.g., a default dosing period including a duration between dosings) and record an initial point in time as a start point (block 1404). The controller 1300 may periodically or continuously check to determine whether a predetermined period of time or duration between dosings (set based on user input or by default) has elapsed (block 1406).

If it is determined that the predetermined period of time has elapsed since the start point ("YES" at block 1406), the controller 1300 transmits a signal and/or electrical energy to the motor 1208 to rotate the rotor 1204 a predetermined distance, thereby causing a predetermined amount of fluid to be dispersed or dosed to standing fluid associated with the fluid treatment system 200 or 200' (block 1410). Alternatively, and optionally, if the predetermined period is determined not to have elapsed ("NO" at block 1406) the controller 1300 may determine whether any signals have been received from sensors (not shown) measuring the buildup of standing fluid and/or fluid in a system being treated (block 1408). If it is determined that fluid buildup has occurred and/or increased beyond a certain amount (e.g., that a predetermined amount of fluid has formed and/or accrued and should be treated) ("YES" at block 1408) the controller 1300 transmits a signal and/or electrical energy to the motor 1208 to rotate the rotor 1204 a predetermined distance, thereby dosing any standing fluid associated with the fluid treatment system 200 or 200' being controlled by the controller 1300 (block 1410). Alternatively, if no fluid buildup has occurred, or if fluid buildup has not formed and exceeded the allowable predetermined amount, the controller 1300 continues to monitor the elapsed time since the start point (block 1406).

In embodiments, the controller 1300 may be in electrical communication with one or more sensors (not explicitly shown) configured to measure the conductivity of a sump 112 at a predetermined position of the sump 112 (e.g., a predetermined depth of the sump 112). Based on sensor signals received by the controller 1300 from the one or more sensors, the controller 1300 may cause the fluid treatment system 200 or 200' to dose standing fluid in the sump 112. This dosing may be based either solely on the presence of fluid in proximity to the sensor, or in combination with the sensor information and a dosing schedule (e.g., predetermined interval by which dosing occurs when one or more sensors detect conductive material (fluid).

For example, initially, a sump 112 having one or more sensors (not explicitly shown) in either wired or wireless communication with the controller 1300 may transmit signals, via the sensors, to the controller 1300 indicating that a conductive material (e.g., fluid) is not present at each of the sensors. In embodiments where each sensors is disposed at a predetermined height associated with a certain volume of standing fluid (e.g., 2", 4", 6" or 1 cu. ft. of fluid, 2 cu. ft. of fluid, etc.) the controller 1300 may cause the fluid treatment system 200 or 200' to dose chemical agents at a predetermined rate. The predetermined dosing rate may be associated with the height or volume of fluid associated with the particular configuration of sensors transmitting positive conductivity sensor signals to the controller 1300 (e.g., 1 cc per minute where 4" of fluid is detected, 2 cc per minute where 2 cu. ft. of fluid is detected, etc.). Once the sensors begin to halt transmitting conductivity measurements, the controller 1300 may adjust the dosing rate accordingly.

Additional to the transmission of the signal and/or energy by the controller 1300 to the motor 1208 to cause the fluid treatment system 200' to dose the area where standing fluid has accrued, the controller 1300 may determine whether the dosing was successful (block 1412). For example, one or more sensors in electrical communication with the controller 1300 configured to monitor the standing fluid may determine whether the concentration of chemical agents in the standing fluid has increased by a predetermined amount (e.g., 1 mL for every 1 L, or any other desirable concentration either preset or set by default). If the dosing is determined to be successful ("YES" at block 1412), process 1400 continues to block 1404 where a new start point is set. Alternatively, if the dosing is determined to be unsuccessful ("NO" at block 1414), the controller 1300 may cause an error signal to be transmitted by the output module 1312 to a display device (e.g., display device 1306 and/or any other remote device such as a remote display, a remote mobile device, and the like, the other remote devices in electrical communication with the controller 1300).

In embodiments, the tube end support member 800 (FIGS. 8A and 8B), hose support member 900 (FIG. 9), alternative hose end support member 1000 (FIG. 10) or hose end support member 1100 (FIG. 11) may be constructed of materials so as to maintain the respective position of each relative to the cooling tower 102 or air handling compartment 100B in which the respective end support member is disposed. More particularly, select components of the hose end support members may be fabricated or formed of metals such as iron, lead, steel, stainless steel, etc., so that fluid flow (either air or liquid) about the hose end support member does not cause the hose end support member to move.

It will become apparent to one skilled in the art that the water treatment system 200 may be installed in environments other than air handling compartments 100 where fluids collect. Examples, provided for illustrative purposes only and not intended to limit the present disclosure, include rooms or areas within a structure affected by leaks of a building's roof, areas subject to water overflow, e.g., a bathroom, and areas of structures which are not sealed from weather, e.g., a loading dock or vehicle storage facility. It is further contemplated that the fluid treatment system 200 may be disposed in areas where standing fluid may build and, as a result, retain or cause undesirable odor to be of gassed. For example, the above-disclosed fluid treatment system 200 may be included where standing water may form in a warehouse, recycling or trash transfer facility, etc., to prevent such standing water from giving off odors therefrom.

The dosing and treatment system may be provided in a kit. The kit is an assembled package (not shown) including a fluid container 204, fluid connector 206, and hose 210. In embodiments, the kit may additionally include one or more fluid container supports 202 one or more intermediate support members 212, a hose support member 214 or any combination thereof kits provided in accordance with systems and methods disclosed herein may also include a controller (e.g., controller 1300) which controls the dispersal of the chemical agents in accordance with the methods described herein.

It will become apparent to one skilled in the art of industrial water treatment that all of the tube/injection end support member 214 embodiments contemplated in this disclosure may be made of a variety of materials, including buoyant materials, corrosion-resistant materials, magnetic materials, or any combination thereof. These materials may be selected to adequately implement the passive biocide system into air handling systems within varying operating environments, such as those with large amounts of standing fluids, or those with higher volumes of air being handled.

It will also become apparent to one skilled in the art of industrial water treatment that variations on the described embodiments found in this disclosure may be contemplated without departing from the nature of the disclosure described. For instance, a treatment dosing system as illustrated in FIGS. 1A and 1B may include a plurality of intermediate injection/dosing tubing supports, or a plurality of fluid containers joined to a fluid connector which may receive more than one fluid source.

Though many variations and embodiments have been described in detail, such description and depictions are for illustrative purposes only and should not be read as limiting the described disclosure. It will be apparent to those of ordinary skill in the art that various modifications, apart from those described, may be made without departing from the scope of the disclosure.

What is claimed is:

1. A recirculating fluid treatment system comprising:

a fluid container configured to enclose a treatment agent, the fluid container including at least one port and a seal arranged in the port to retain the treatment agent in the fluid container;

a connector configured to mate with the port and seal to fluidly connect with the treatment agent within the fluid container;

a metering mechanism in fluid communication with the connector and configured to output a desired dose of the treatment agent;

a motor controller configured to energize a motor mechanically coupled to the metering mechanism; and a hose including a fluid outlet, the hose in fluid communication with an outlet of the metering mechanism, the hose configured for insertion directly into the recirculating fluid treatment system for treatment of recirculating fluid, wherein the motor controller causes the metering mechanism to pump the desired dose of the treatment agent at a predetermined frequency through the hose to directly dose the recirculating fluid independent of a pump employed to circulate the recirculating fluid.

2. The recirculating fluid treatment system of claim 1, further comprising a battery in electrical communication with the motor controller and the motor.

3. The recirculating fluid treatment system of claim 2, further comprising a solar panel in electrical communication with the battery and configured to deliver electrical energy to the battery to charge the battery.

4. The recirculating fluid treatment system of claim 1, wherein the metering mechanism is an aerosolizing pump, wherein the desired dose of the treatment agent is aerosolized.

5. The recirculating fluid treatment system of claim 1, further comprising a hose end support member configured to hold the fluid outlet of the hose above a surface level of the recirculating fluid.

6. The recirculating fluid treatment system of claim 1, further comprising a second controller in communication with the motor controller and an output device.

7. The recirculating fluid treatment system of claim 6, further comprising a sensor in communication with the recirculating fluid, the sensor configured to output a signal indicative of whether a concentration of the treatment agent exceeds a desired threshold to the motor controller.

8. The recirculating fluid treatment system of claim 7, wherein the sensor is in wireless communication with the motor controller.

9. The recirculating fluid treatment system of claim 8, wherein upon determining that the concentration does not exceed the desired threshold, the motor controller outputs an error signal.

10. The recirculating fluid treatment system of claim 1, wherein the treatment agent is selected from the group consisting of comprising a treatment agent, a biocide, a biostatic, dispersant, inhibitor an acidic or alkaline solution, a neutral solution, a solvent, a corrosion or scale inhibitor, or solutions and mixtures thereof.

11. The recirculating fluid treatment system of claim 1, wherein the fluid container includes at least two compartments divided by at least one membrane.

12. The recirculating fluid treatment system of claim 1, further comprising a housing configured to receive the fluid container, the metering mechanism, the motor, and the motor controller.

13. The recirculating fluid treatment system of claim 1, wherein the fluid container and metering mechanism are integrally formed.

14. The recirculating fluid treatment system of claim 1, wherein the metering mechanism is selected from the group consisting of a peristaltic pump, a rotary lobe pump, an aerosolizing pump, and a progressive cavity pump.

15. A recirculating fluid treatment system comprising:

a single-use fluid container configured to enclose a treatment agent, the single-use fluid container including at least one port and a seal arranged in the port to retain the treatment agent in the fluid container;

a connector configured to mate with the port and seal to fluidly connect with the treatment agent within the single-use fluid container;

a metering mechanism in fluid communication with the connector and configured to output a desired dose of the treatment agent;

a motor controller configured to energize a motor mechanically coupled to the metering mechanism; and a hose including a fluid outlet, the hose in fluid communication with an outlet of the metering mechanism, the hose configured for insertion directly into the recirculating fluid treatment system for treatment of recirculating fluid, wherein the motor controller causes the metering mechanism to pump the desired dose of the treatment agent to dose the recirculating fluid.

16. A recirculating fluid treatment system comprising:

a refillable bottle configured to enclose a treatment agent, the refillable bottle including at least one port and a seal arranged in the port to retain the treatment agent in the refillable bottle;

a spike configured to mate with the port and seal to fluidly connect with the treatment agent within the refillable bottle;

a metering mechanism in fluid communication with the connector and configured to output a desired dose of the treatment agent;

a motor controller configured to energize a motor mechanically coupled to the metering mechanism; and a hose including a fluid outlet, the hose in fluid communication with an outlet of the metering mechanism, the hose configured for insertion directly into the recirculating fluid treatment system for treatment of recirculating fluid, wherein the motor controller causes the metering mechanism to pump the desired dose of the treatment agent to dose the recirculating fluid.

* * * * *